US011141659B2

(12) United States Patent
Matsushita et al.

(10) Patent No.: US 11,141,659 B2
(45) Date of Patent: Oct. 12, 2021

(54) INFORMATION PROCESSING SYSTEM AND STORAGE MEDIUM STORING INFORMATION PROCESSING PROGRAM

(71) Applicant: NINTENDO CO., LTD., Kyoto (JP)

(72) Inventors: Shingo Matsushita, Kyoto (JP); Kouhei Maeda, Kyoto (JP); Yuji Ohashi, Kyoto (JP); So Araya, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/835,827

(22) Filed: Mar. 31, 2020

(65) Prior Publication Data

US 2020/0316467 A1   Oct. 8, 2020

(30) Foreign Application Priority Data

Apr. 4, 2019   (JP) .............................. JP2019-072145

(51) Int. Cl.
*A63F 13/537* (2014.01)
*A63F 13/58* (2014.01)

(52) U.S. Cl.
CPC ............ *A63F 13/537* (2014.09); *A63F 13/58* (2014.09)

(58) Field of Classification Search
CPC ............................... A63F 13/537; A63F 13/58
See application file for complete search history.

(56) References Cited

U.S. PATENT DOCUMENTS

| | | | | |
|---|---|---|---|---|
| 6,342,008 B1* | 1/2002 | Toyohara | ................ | A63F 13/10 463/23 |
| 7,980,949 B2* | 7/2011 | Sakaguchi | ............ | A63F 13/822 463/30 |
| 8,016,664 B2* | 9/2011 | Thomas | ................... | A63F 13/00 463/23 |
| 8,882,594 B2* | 11/2014 | Rippy | ................... | A63F 13/533 463/33 |
| 9,123,071 B1* | 9/2015 | McFarland | ........ | G06Q 30/0603 |
| 2006/0287027 A1* | 12/2006 | Hardisty | ................. | A63F 13/42 463/8 |
| 2010/0235351 A1* | 9/2010 | Iwasa | ...................... | G06F 16/78 707/723 |
| 2010/0311483 A1* | 12/2010 | Fields | ..................... | A63F 13/49 463/2 |
| 2011/0022450 A1* | 1/2011 | Meredith | ........... | G06Q 30/0241 705/14.4 |
| 2017/0169112 A1* | 6/2017 | Chiplonkar | ......... | G06F 16/9535 |
| 2019/0377465 A1* | 12/2019 | Singal | .................... | H04L 67/02 |

FOREIGN PATENT DOCUMENTS

JP   2017-225863   12/2017

* cited by examiner

*Primary Examiner* — Steve Rowland

(74) *Attorney, Agent, or Firm* — Nixon & Vanderhye P.C.

(57) ABSTRACT

At least one first group and at least one second group each including contents chosen by a user are previously stored into a storage medium. The first group of the groups stored in the storage medium is presented as an option to the user, with a higher priority than that of other options, during a first period of time. The second group of the groups stored in the storage medium is presented as an option to the user, with a higher priority than that of other options, during a second period of time. One of the presented groups chosen by the user is determined as a group to be used in a game process. The game process is performed using contents included in the determined group.

9 Claims, 16 Drawing Sheets

FIG. 11

| | CHOICE FOR SEASON 1 | CHOICE FOR SEASON 2 | CHOICE FOR SEASONS 1 & 2 |
|---|---|---|---|
| OFFENSIVE UNIT | OFFENSIVE TROOP 1 FOR SEASON 1 | OFFENSIVE TROOP 1 FOR SEASON 2 | OFFENSIVE TROOP 1 FOR ALL SEASONS |
| | OFFENSIVE TROOP 2 FOR SEASON 1 | OFFENSIVE TROOP 2 FOR SEASON 2 | OFFENSIVE TROOP 2 FOR ALL SEASONS |
| | OFFENSIVE TROOP 3 FOR SEASON 1 | OFFENSIVE TROOP 3 FOR SEASON 2 | OFFENSIVE TROOP 3 FOR ALL SEASONS |
| | OFFENSIVE TROOP 4 FOR SEASON 1 | OFFENSIVE TROOP 4 FOR SEASON 2 | OFFENSIVE TROOP 4 FOR ALL SEASONS |
| | OFFENSIVE TROOP 5 FOR SEASON 1 | OFFENSIVE TROOP 5 FOR SEASON 2 | OFFENSIVE TROOP 5 FOR ALL SEASONS |
| | OFFENSIVE EQUIPMENT | | |
| DEFENSIVE UNIT | DEFENSIVE TROOP FOR SEASON 1 | DEFENSIVE TROOP FOR SEASON 2 | DEFENSIVE TROOP FOR ALL SEASONS |
| | DEFENSIVE EQUIPMENT FOR SEASON 1 | DEFENSIVE EQUIPMENT FOR SEASON 2 | DEFENSIVE EQUIPMENT FOR ALL SEASONS |
| | DEFENSIVE MAP FOR SEASON 1 | DEFENSIVE MAP FOR SEASON 2 | DEFENSIVE MAP FOR ALL SEASONS |

FIG. 13

| INCREASE/DECREASE IN RATE ON OFFENSE | |
|---|---|
| RESULT | INCREASE/DECREASE IN RATE |
| WIN WITH FOUR OBJECTS REMAINING | +80 |
| WIN WITH THREE OBJECTS REMAINING | +60 |
| WIN WITH TWO OBJECTS REMAINING | +40 |
| WIN WITH ONE OBJECT REMAINING | +20 |
| LOSS (NO OBJECTS REMAINING/ONE OR MORE OBJECTS ON DEFENSE REMAINING) | ±0 |

FIG. 14

| INCREASE/DECREASE IN RATE ON DEFENSE | |
|---|---|
| RESULT | INCREASE/DECREASE IN RATE |
| LOSS WITH FOUR OPPONENT OBJECTS REMAINING | −80 |
| LOSS WITH THREE OPPONENT OBJECTS REMAINING | −60 |
| LOSS WITH TWO OPPONENT OBJECTS REMAINING | −40 |
| LOSS WITH ONE OPPONENT OBJECT REMAINING | −20 |
| WIN (NO OPPONENT OBJECTS REMAINING/ONE OR MORE OBJECTS ON DEFENSE REMAINING) | ±0 |

INFORMATION PROCESSING SYSTEM AND STORAGE MEDIUM STORING INFORMATION PROCESSING PROGRAM

CROSS REFERENCE TO RELATED APPLICATIONS

The disclosure of Japanese Patent Application No. 2019-72145, filed Apr. 4, 2019, is incorporated herein by reference.

FIELD

The technology disclosed herein relates to information processing systems and storage media storing information processing programs. More particularly, the technology disclosed herein relates to, for instance, an information processing system and a storage medium storing an information processing program that perform a process using a group including contents chosen by a user.

BACKGROUND AND SUMMARY

There is a conventional game program which relates to a game in which chosen contents chosen from a plurality of contents possessed by a user appear, and a setting in the game is changed to be advantageous to the user by changing chosen contents that appear at predetermined intervals.

However, in the above game performed by execution of the above game program, there is room for improvement in the user's convenience in terms of changing of chosen contents that appear at intervals.

With the above in mind, an object of this non-limiting example is to provide an information processing system and storage medium storing an information processing program that can improve the user's convenience of choosing a content for use in a game during a specific period of time.

To achieve the above, this non-limiting example has the following features, for instance. It should be understood that the scope of the present technology is defined only by the appended claims. To the extent of any inconsistency or conflict in disclosure between the description and the claims appended hereto, the claims shall prevail.

A non-limiting example configuration of an information processing system according to this non-limiting example, includes a computer that executes: previously storing, into a storage medium, at least one first group and at least one second group each including contents chosen by a user; presenting, to the user, the first group of the groups stored in the storage medium as an option, with a higher priority than that of other options, during a first period of time, and the second group of the groups stored in the storage medium as an option, with a higher priority than that of other options, during a second period of time; determining one of the presented groups chosen by the user, as a group to be used in a game process; and performing the game process using contents included in the determined group.

With the above configuration, at least one content group previously configured for each period of time is presented as an option to be used in a game process, with a higher priority, depending on a period of time during which the game process is performed, resulting in an improvement in the convenience of choosing a content group to be used in the game process for each period of time.

Only the first group of the groups stored in the storage medium may be presented as an option during the first period of time, and only the second group of the groups stored in the storage medium may be presented as an option during the second period of time.

With the above configuration, only an option(s) configured for each period of time can be presented to the user during that period of time, resulting in a further improvement in the user's convenience.

In the case where a period of time during which the game process is performed is included in the first period of time, and the determined group includes contents associated with the first period of time, the game process may be performed so as to obtain an effect, and in the case where a period of time during which the game process is performed is included in the second period of time, and the determined group includes contents associated with the second period of time, the game process may be performed so as to obtain an effect.

With the above configuration, the convenience of choosing a group can be further improved in a game in which different effects are obtained using different groups during different periods of time.

At least one third group including contents chosen by the user may be stored into the storage medium. The computer may further execute setting a first option setting in which the third group is excluded from options, or a second option setting in which the third group is included in options. In the case where the first option setting is set, the first group may be presented as an option to the user, with a higher priority than that of other options, during the first period of time, and the second group may be presented as an option to the user, with a higher priority than that of other options, during the second period of time. In the case where the second option setting is set, the third group of the groups stored in the storage medium may be presented as an option to the user, with a higher priority than that of other options, both during the first period of time and during the second period of time.

With the above configuration, a group can be more flexibly chosen, resulting in a further improvement in the convenience of choosing a group.

The computer may further execute alternately setting at least the first period of time and the second period of time.

With the above configuration, in a game in which different periods of time are alternately set, it is not necessary to reset or find a group to be used for each period of time, resulting in a further improvement in the user's convenience.

The computer may further execute, in the case where the game process is performed during the first period of time, obtaining information about contents included in a first defensive group that is set by another user as a defensive group to be used during the first period of time, and in the case where the game process is performed during the second period of time, obtaining information about contents included in a second defensive group that is set by another user as a defensive group to be used during the second period of time. In the case where the game process is performed during the first period of time, a battle game may be performed in which contents included in the obtained first defensive group are caused to appear, on defense, and contents included in the determined group are caused to appear, on offense. In the case where the game process is performed during the second period of time, a battle game may be performed in which contents included in the obtained second defensive group are caused to appear, on defense, and contents included in the determined group are caused to appear, on offense.

With the above configuration, a group including contents of another user to be attacked is also chosen, depending on a period of time, resulting in an improvement in amusingness of a game. In addition, convenience can be improved in a scene where a defensive group to be attacked from another user is set.

The computer may further execute presenting, to the user, an organization screen for the first group and/or the second group stored in the storage medium. The organization screen may be presented, including information about an effect obtained in the game process in the case where the first group is used during the first period of time, and the organization screen may be presented, including information about an effect obtained in the game process in the case where the second group is used during the second period of time.

With the above configuration, a group can be organized while an advantage/disadvantage is checked for each period of time.

Another non-limiting example configuration of an information processing system according to this non-limiting example includes a computer that executes: previously storing, into a storage medium, at least one first group and at least one second group each including contents chosen by a first user; and in the case where a game process is performed during a first period of time using contents of a second user according to the second user's operation instruction, performing the game process using contents included in the first group stored in the storage medium, and in the case where a game process is performed during a second period of time using contents of a second user according to the second user's operation instruction, performing the game process using contents included in the second group stored in the storage medium.

With the above configuration, a content group of the first user to be used in a game in which contents of the second user are used is automatically set from groups stored by the first user as content groups for the respective periods of time, depending on a period of time during which the game process is performed, resulting in an improvement in the convenience of setting a content group to be used in a game process for each period of time.

The computer may further execute storing, into the storage medium, first field information including information about contents included in the first group and game field information about locations where the contents are disposed, and second field information including information about contents included in the second group and game field information about locations where the contents are disposed. In the case where a game process is performed during the first period of time using contents of the second user according to the second user's operation instruction, the game process may be performed using the first field information, and in the case where a game process is performed during the second period of time using contents of the second user according to the second user's operation instruction, the game process may be performed using the second field information.

With the above configuration, the stored field information can be used, depending on a period of time during which a game process is performed, resulting in a further improvement in convenience.

In addition, this non-limiting example may be carried out in the form of a storage medium storing an information processing program.

According to this non-limiting example, at least one content group previously configured for each period of time is presented as an option to be used in a game process, with a higher priority, depending on a period of time during which the game process is performed, resulting in an improvement in the convenience of choosing a content group to be used in a game process for each period of time.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 11 is a diagram showing a non-limiting example troop, equipment, and map chosen for each season, FIG. 13 is a diagram showing a non-limiting example increase or decrease in a rate parameter of a user that occurs when the user attacks a battle opponent, FIG. 14 is a diagram showing a non-limiting example increase or decrease in the rate parameter of a user that occurs when the user defends against a battle opponent's attack.

DETAILED DESCRIPTION OF NON-LIMITING EXAMPLE EMBODIMENTS

Figure 1:
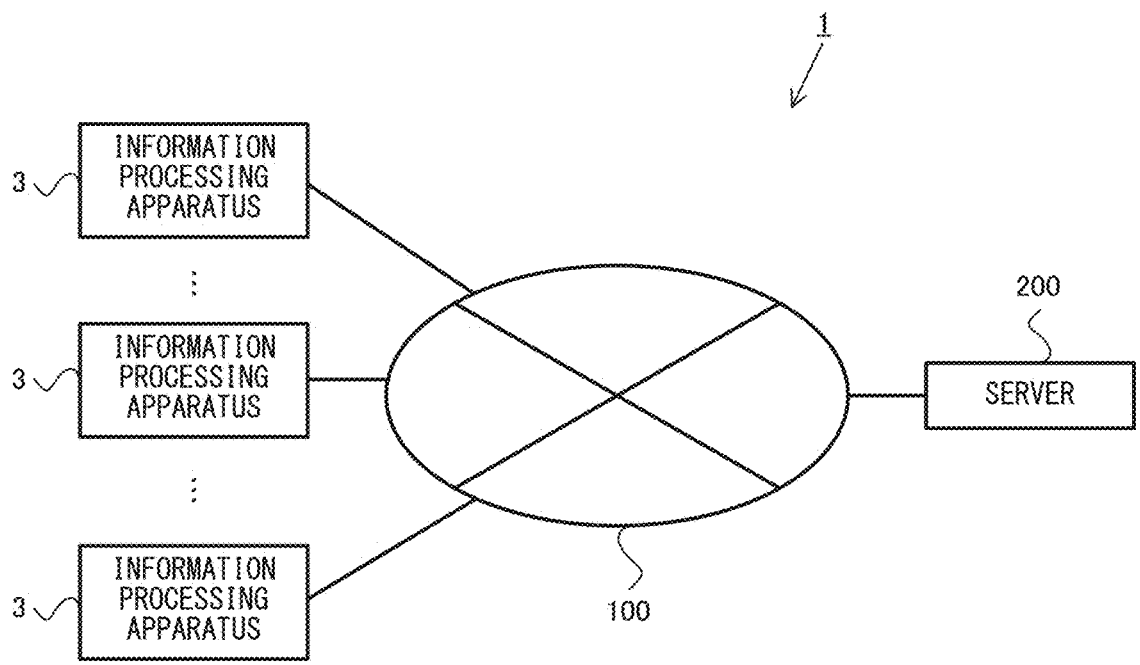
FIG. 1 is a diagram showing a non-limiting example of an information processing system 1 according to this non-limiting example.

An information processing system according to this non-limiting example will be described with reference to FIG. 1. As shown in FIG. 1, an information processing system 1 that is a non-limiting example of the information processing system of this non-limiting example, includes a plurality of information processing apparatuses 3 and a server 200, which are connected together through a network 100.

The information processing apparatuses 3 are configured to be able to connect to the network 100 through wireless or wired communication. The information processing apparatuses 3 and the server 200 constitute a client-server system. For instance, the information processing apparatuses 3 can execute a predetermined application (e.g., a game application, etc.). The information processing apparatuses 3 can connect to and communicate with the server 200 through the network 100 by executing the above predetermined application. For instance, the information processing apparatuses 3 can execute an information processing program that is stored in a replaceable storage medium, such as a memory card or an optical disc, or is received from another apparatus. The information processing apparatuses 3 may be a device such as a typical personal computer, stationary game machine, mobile telephone (a smartphone, etc.), handheld game console, or personal digital assistant (PDA). In the case where the information processing apparatuses 3 each execute a game application, the information processing system 1 can function as a game system.

Figure 2:
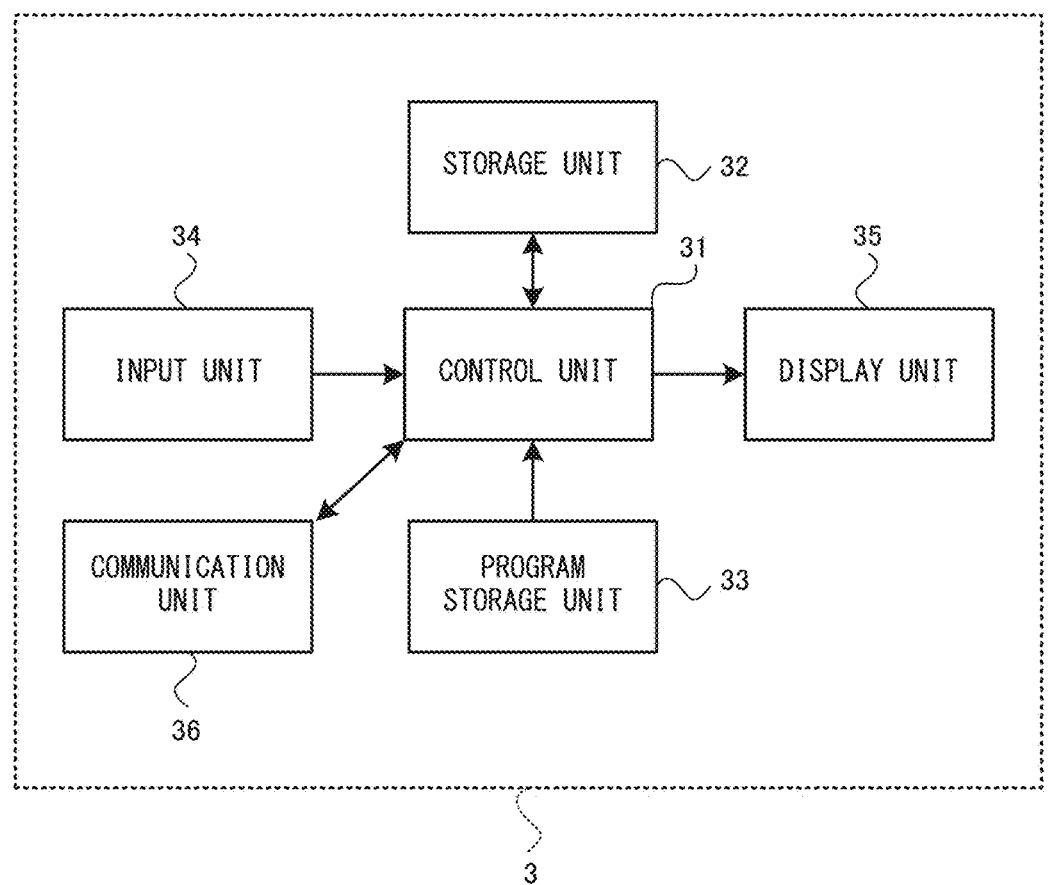
FIG. 2 is a block diagram showing a non-limiting example configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For instance, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for instance, a memory that can be accessed by the control unit 31 (e.g., a CPU).

The program storage unit 33 stores programs. The program storage unit 33 may be any storage device (storage medium) that can be accessed by the control unit 31. For instance, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device.

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
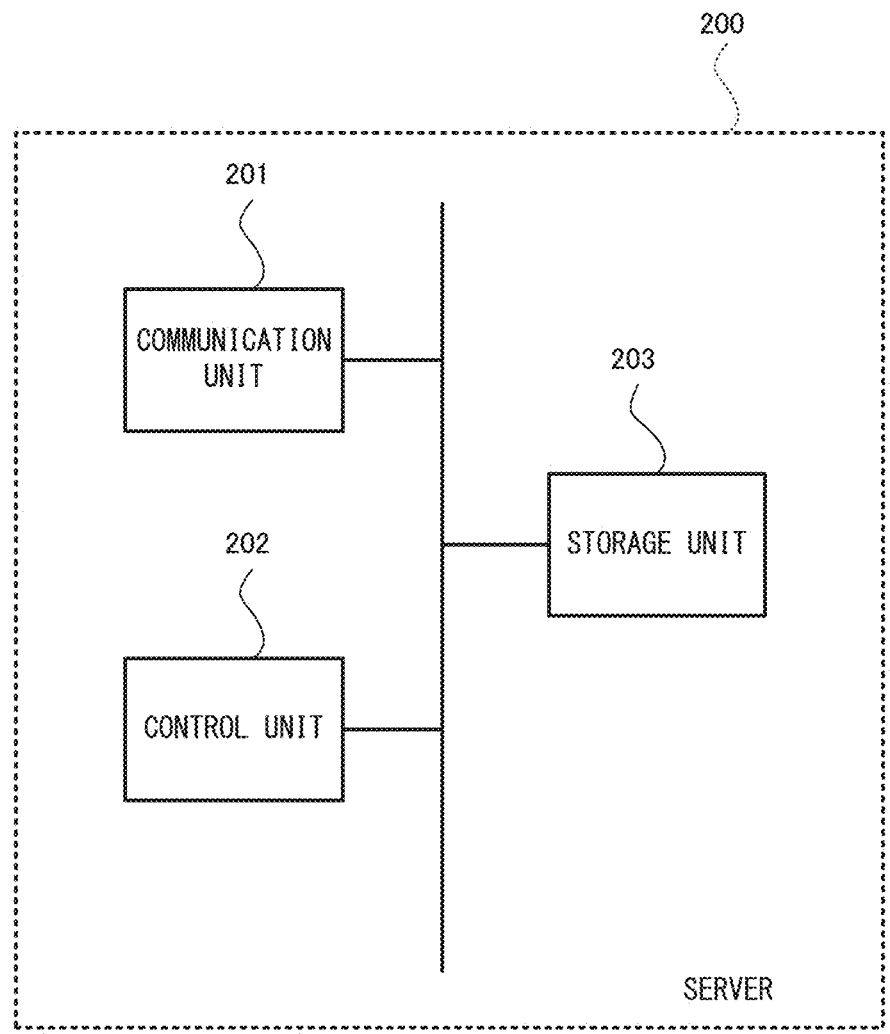
FIG. 3 is a block diagram showing a non-limiting example configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. The control unit 202 performs a process of managing the progression of a game performed along with the information processing apparatuses 3, a process of managing a game map (game field) provided to a user, and a process of managing payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
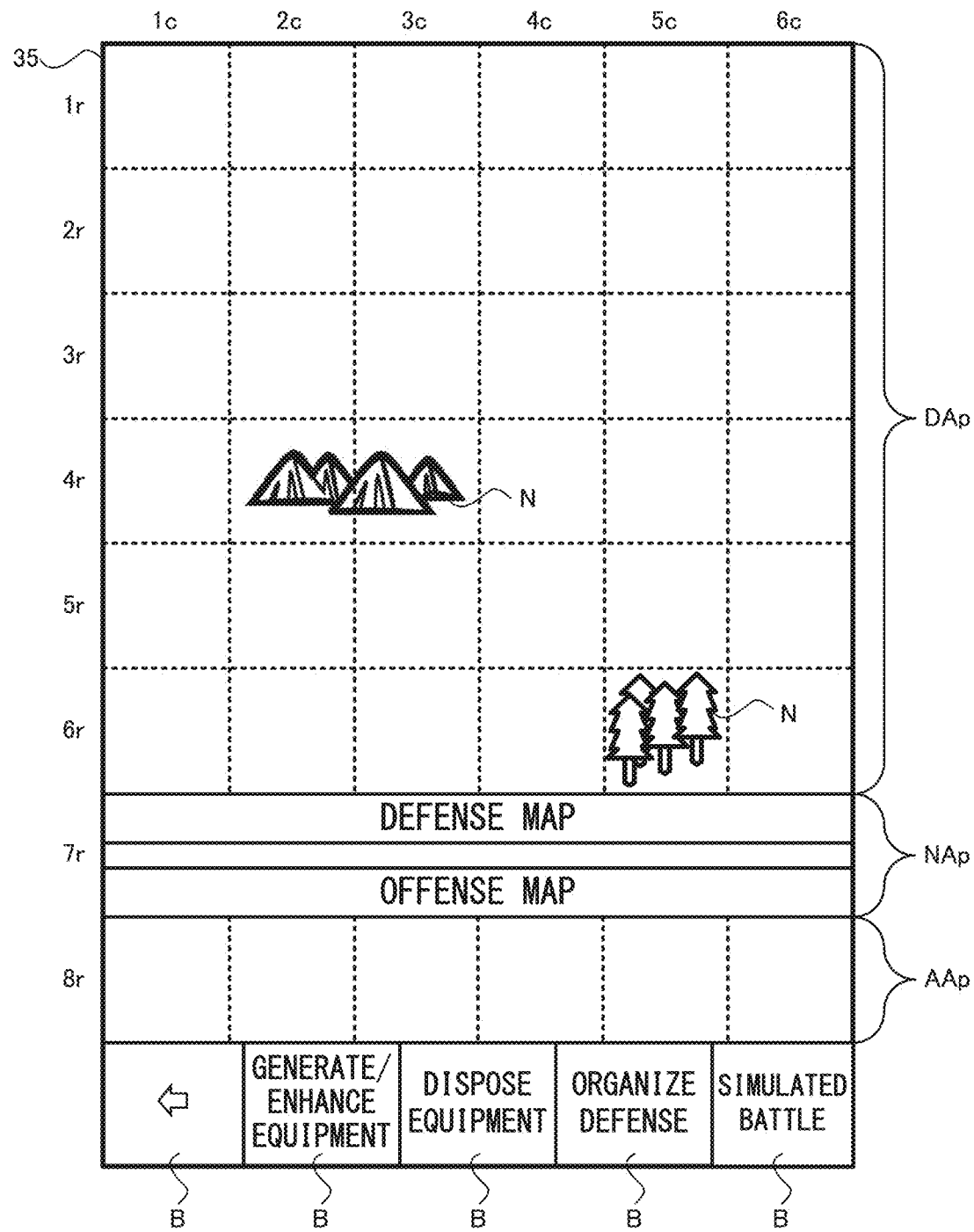
FIG. 4 is a diagram showing a non-limiting example game map (game field) for use in a battle game performed in the information processing apparatus 3.
Figure 5:
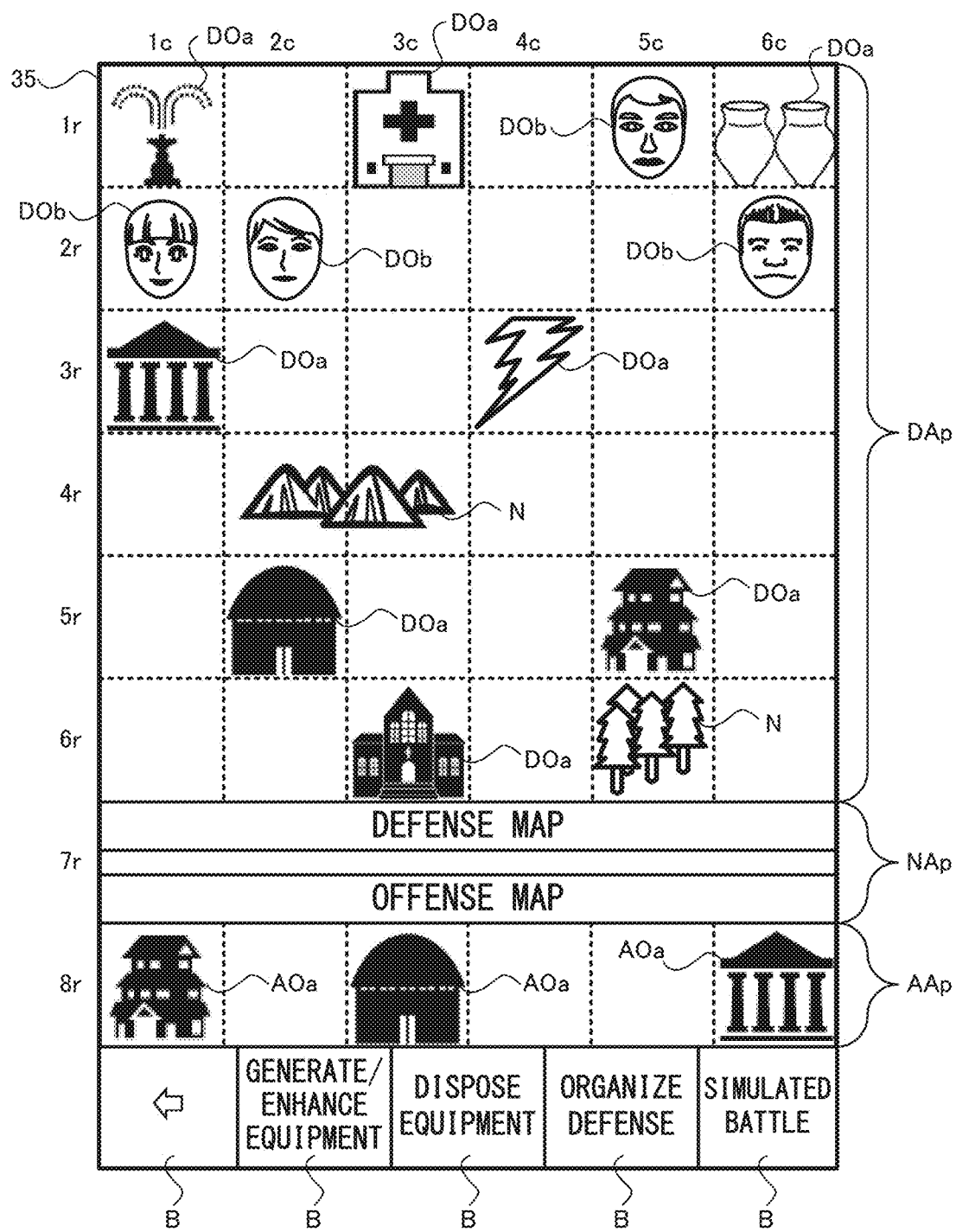
FIG. 5 is a diagram showing a non-limiting example disposition of an own offensive equipment object AOa, an own defensive equipment object DOa, and an own defensive player object DOb on the game map.
Figure 6:
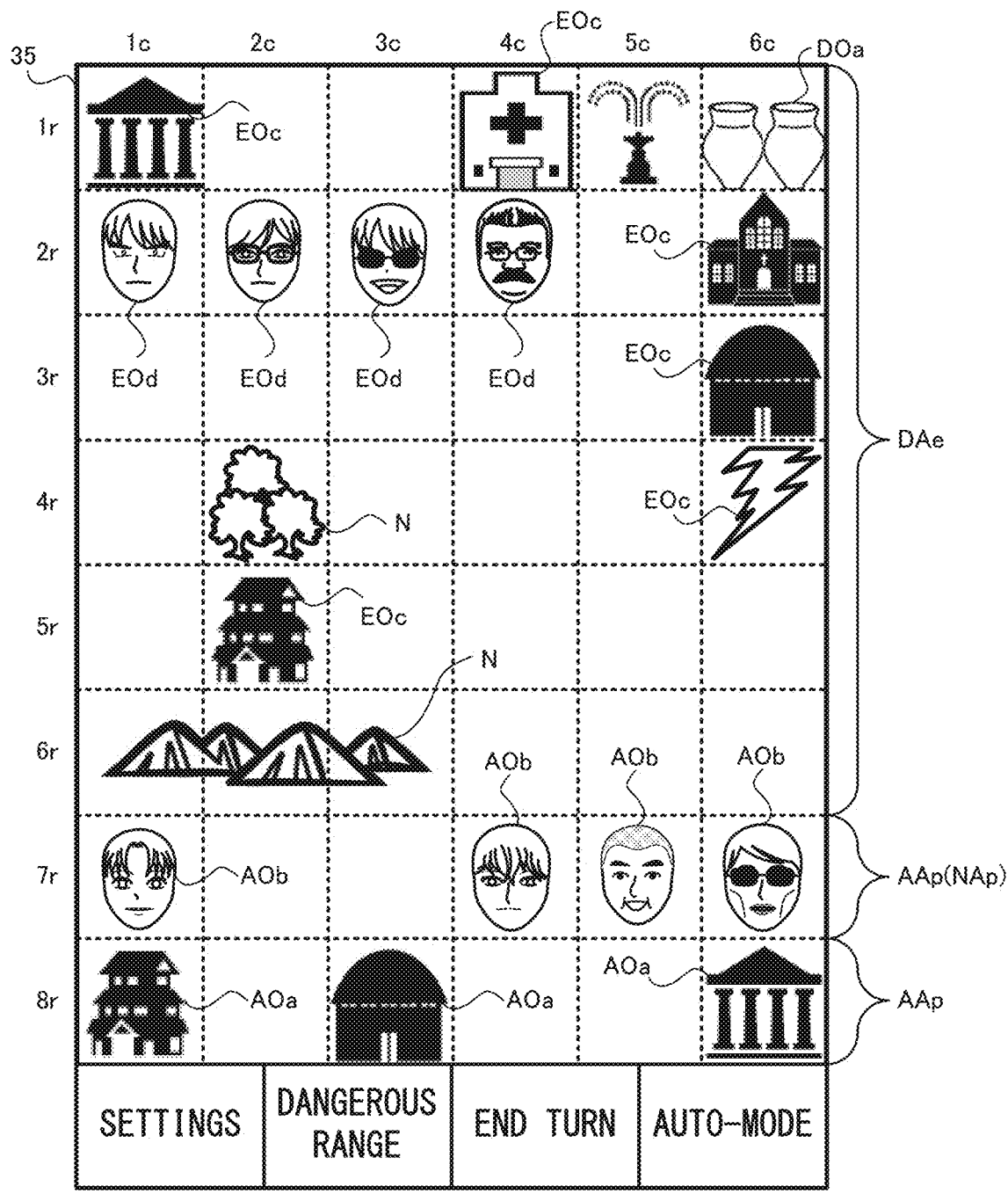
FIG. 6 is a diagram showing non-limiting example attacks performed by an own offensive equipment object AOa and an own offensive player object AOb using an opponent's defense map.
Figure 7:
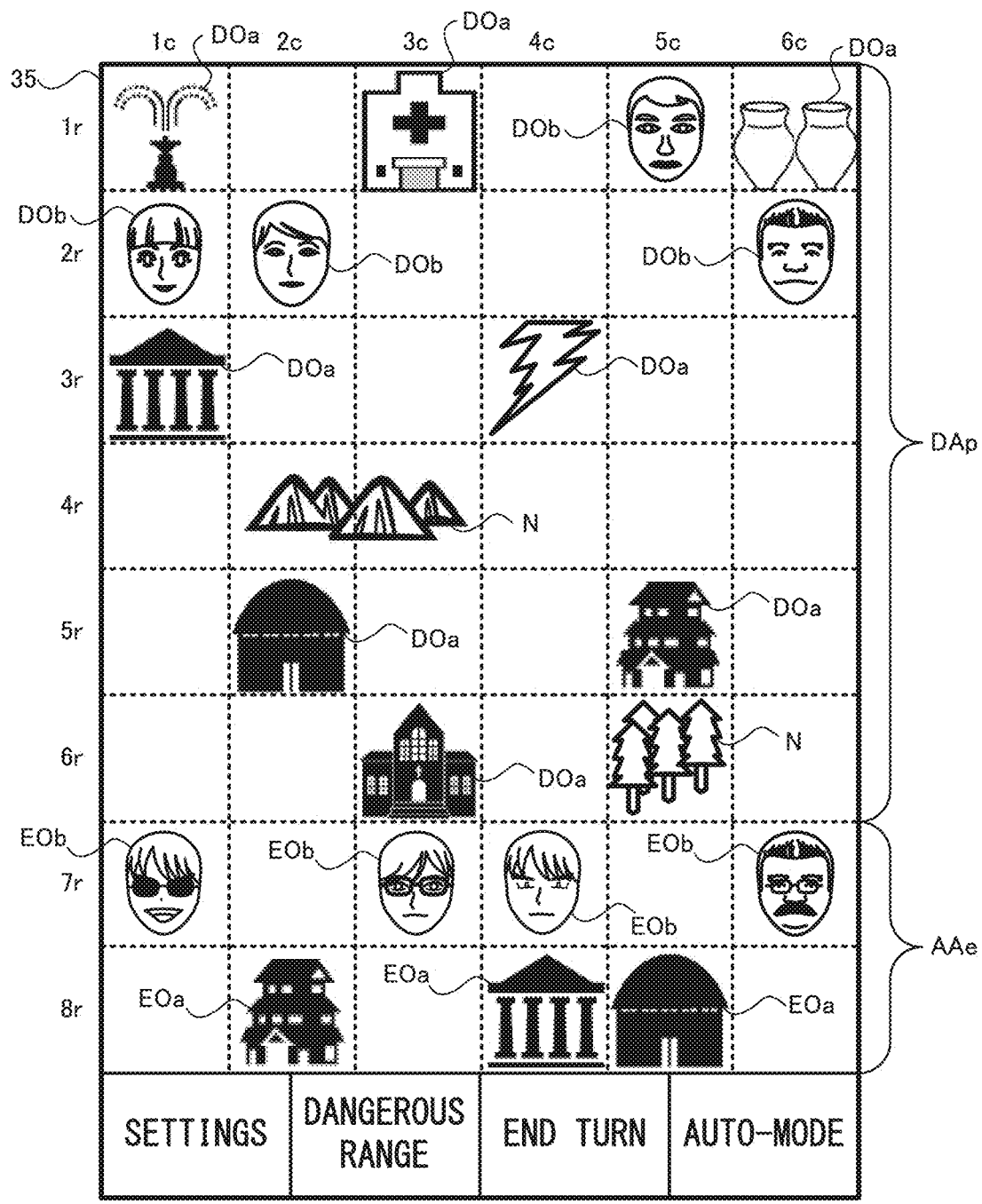
FIG. 7 is a diagram showing a non-limiting example defense against attacks performed by an opponent offensive equipment object EOa and an opponent offensive player object EOb using an own defense map.
Figure 8:
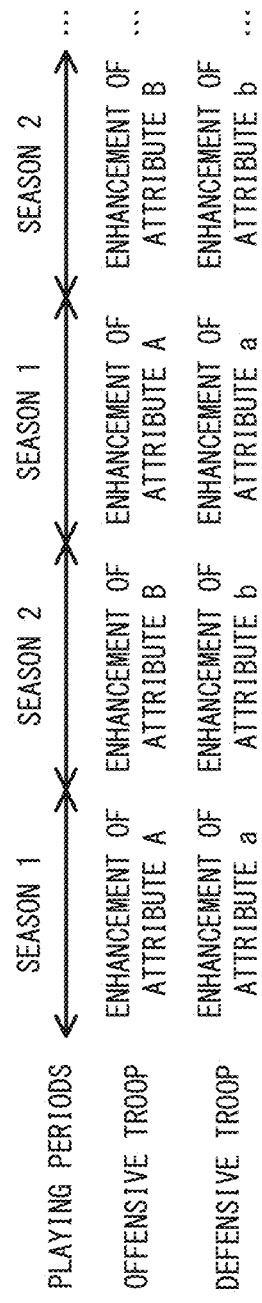
FIG. 8 is a diagram showing a non-limiting example season set in a battle game performed in the information processing apparatus 3.
Figure 9:
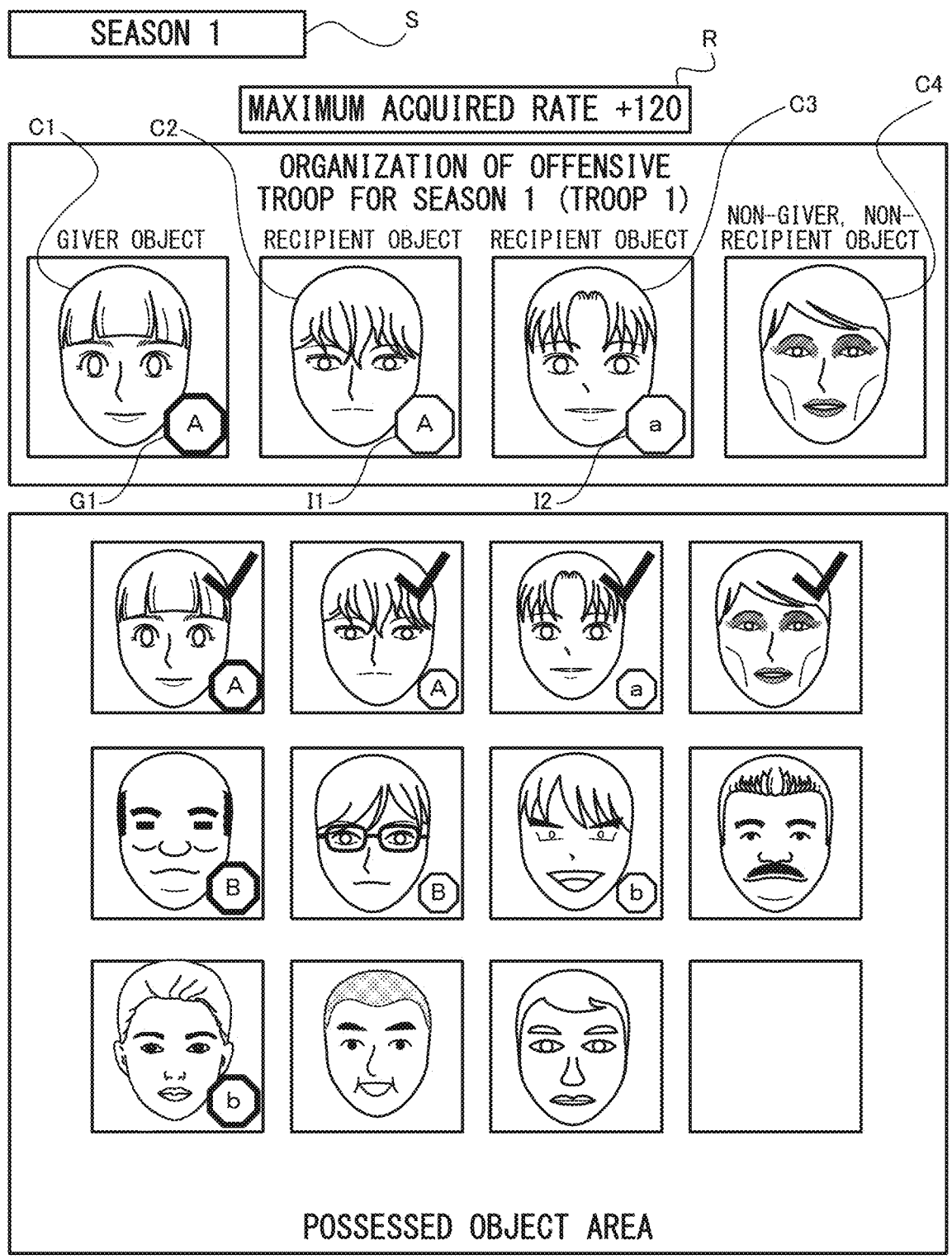
FIG. 9 is a conceptual diagram showing a non-limiting example troop organization process performed in the information processing apparatus 3.
Figure 10:
FIG. 10 is a conceptual diagram showing another non-limiting example troop organization process performed in the information processing apparatus 3.
Figure 12:
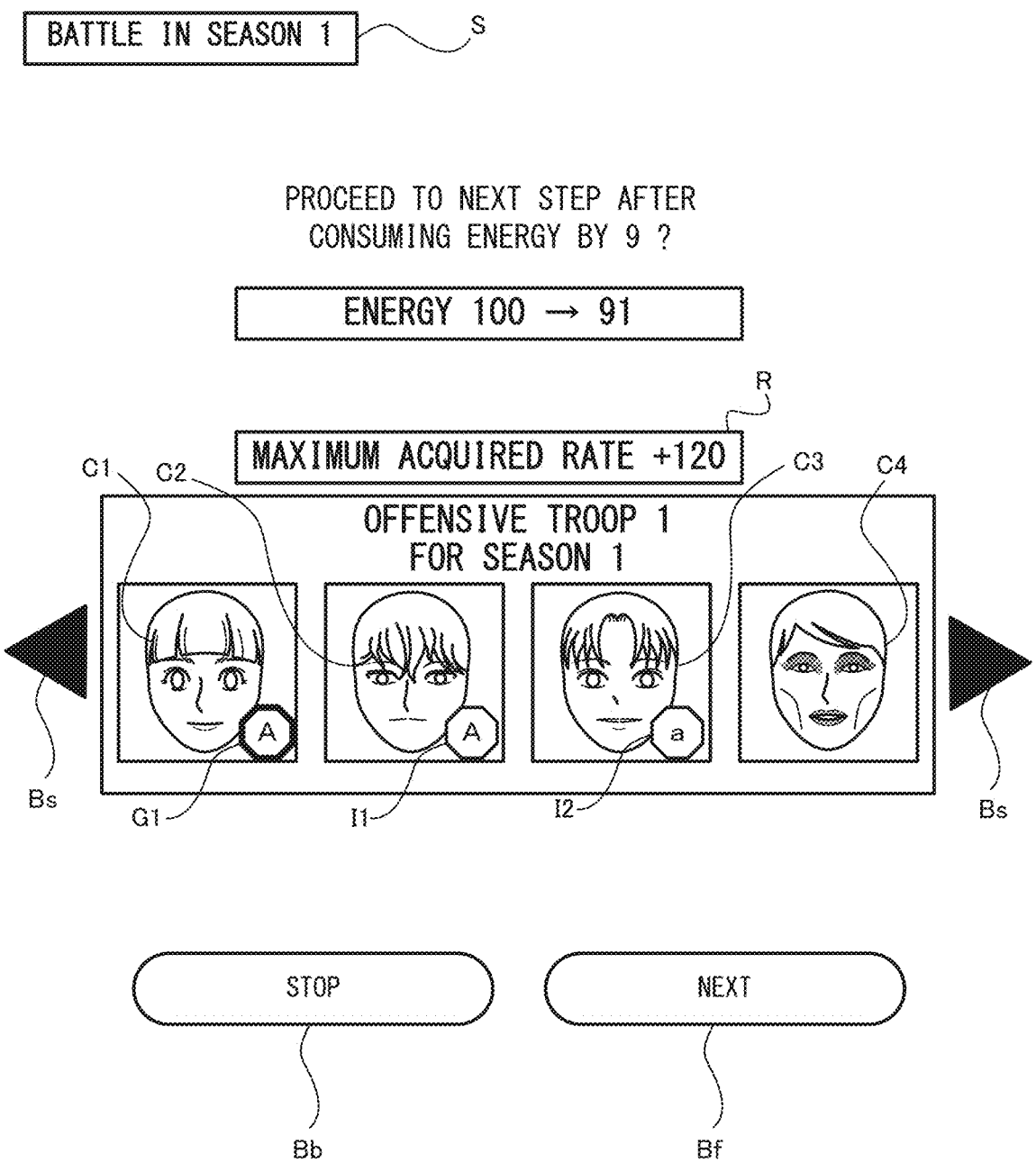
FIG. 12 is a diagram showing a non-limiting example screen for choosing an offensive troop that is to appear in a battle game, from offensive troops organized for each season.

Next, before describing specific processes performed by the information processing apparatus 3 when the information processing apparatus 3 is connected to the server 200, a non-limiting example process performed in the information processing system 1 will be outlined with reference to FIGS. 4-14. It should be noted that FIG. 4 is a diagram showing a non-limiting example game map (game field) for use in a battle game performed in the information processing apparatus 3. FIG. 5 is a diagram showing a non-limiting example disposition of an own offensive equipment object AOa, an own defensive equipment object DOa, and an own defensive player object DOb on the game map. FIG. 6 is a diagram showing non-limiting example attacks performed by an own offensive equipment object AOa and an own offensive player object AOb using an opponent's defense map. FIG. 7 is a diagram showing a non-limiting example defense against attacks performed by an opponent offensive equipment object EOa and an opponent offensive player object EOb using an own defense map. FIG. 8 is a diagram showing a non-limiting example season set in a battle game performed in the information processing apparatus 3. FIG. 9 is a conceptual diagram showing a non-limiting example troop organization process performed in the information processing apparatus 3. FIG. 10 is a conceptual diagram showing another non-limiting example troop organization process performed in the information processing apparatus 3. FIG. 11 is a diagram showing a non-limiting example troop, equipment, and map chosen for each season. FIG. 12 is a diagram showing a non-limiting example screen for choosing an offensive troop that is to appear in a battle game, from offensive troops organized for each season. FIG. 13 is a diagram showing a non-limiting example increase or decrease in a rate parameter of a user that occurs when the user attacks a battle opponent. FIG. 14 is a diagram showing a non-limiting example increase or decrease in the rate parameter of a user that occurs when the user defends against a battle opponent's attack. In the description that follows, an application for performing a battle game is used as a non-limiting example application executed in the information processing apparatus 3. Alternatively, an application for performing another game or an application that is not a game may be executed in the information processing apparatus 3.

A non-limiting example game map used in a battle game performed in the information processing apparatus 3 will be described with reference to FIG. 4. In the battle game of this non-limiting example, a plurality of objects possessed by a user can appear and fight against another user's object that is a battle opponent, using a game map. For instance, in this non-limiting example, a player's turn (offense turn) in which a user operates an offensive object and an opponent's turn (defense turn) in which a computer that is a battle opponent controls a defensive object set by another user so as to operate the defensive character alternate. By the player and the opponent taking turns, a battle game is performed between an offensive object and a defensive object. For instance, by operating the input unit 34 in the player's turn, a user can operate a plurality of offensive objects disposed on a game map, and the game map as viewed from above is displayed on the display unit 35. The game map is, for instance, a two-dimensional map, in which a plurality of areas where an object possessed by a user can be disposed are formed and arranged in a grid pattern. For instance, in each area, a single object possessed by a user can be disposed, and a plurality of areas are formed and arranged in a grid pattern having eight rows and six columns (rows $1r$-$8r$ and columns $1c$-$6c$).

The user of the information processing apparatus 3 is allowed to edit a game map. The game map has a defense map area DAp for disposing a defensive object for defending against an attack from an object of another user who is a battle opponent, and an offense map area AAp for disposing an offensive object for attacking an object of another user who is a battle opponent. In the non-limiting example of FIG. 4, the defense map area DAp is set in the first row to the sixth row (rows $1r$-$6r$) in the above grid-pattern area. The offense map area AAp is set in the eighth row (row $8r$) in the above grid-pattern area. In the seventh row (row $7r$) of the above grid-pattern area, which is located between the defense map area DAp and the offense map area AAp, a neutral map area NAp is set where an object cannot be disposed in map editing. As described below, when a battle game is performed, the neutral map area Nap functions as an offense map area where the user's offensive object (specifically, an own offensive player object AOb) can be disposed. The user of the information processing apparatus 3 can edit the game map by disposing a player object or equipment object possessed by the user themselves in the defense map area DAp and the offense map area AAp.

The user of the information processing apparatus 3 is allowed to choose a game map to be edited, by choosing a terrain to be used in a battle from a plurality of kinds of terrains previously prepared. For instance, on the game map, a terrain object N such as a forest, mountain, pond, or wall is disposed, depending on the chosen terrain, and in map editing, a player object or equipment object possessed by the user cannot be disposed on terrain objects N. Terrain objects N are a player object which cannot be invaded or attacked even in a battle game.

As shown in FIG. 5, an equipment object and player object that are possessed by the user themselves can be disposed on the defense map area DAp of the game map. When an equipment object possessed by the user themselves is disposed in the defense map area DAp, the equipment object functions as an own defensive equipment object DOa. When a player object possessed by the user themselves is disposed in the defense map area DAp, the player object functions as an own defensive player object DOb. Thereafter, the own defensive equipment object DOa and the own defensive player object DOb, when fighting against another user's object (offensive object), serve as a defensive object for defending an own territory.

For instance, own defensive equipment objects DOa include a building object and weapon object that cause damage to another user's object (offensive object) disposed in a predetermined range, and increase/restore an ability of an own object (defensive object) disposed in a predetermined range, to enhance offensive power, a trap object that causes damage to another user's object (offensive object) that is invading or intruding, and limits the amount of movement of such an invading or intruding object, an obstruction object that obstructs invasion or intrusion of an object, etc. For instance, as shown in FIGS. 4 and 5, on a display screen for map editing, an "equipment disposition" operation button B is provided for calling an equipment object possessed by the user themselves and disposing the equipment object on a game map (defense map area DAp). By performing an operation of choosing the "equipment disposition" operation button B, an equipment object to be disposed on a game map (defense map area DAp) can be chosen from those possessed by the user themselves.

Own defensive equipment objects DOa may also include a building object (e.g., own defensive equipment objects DOa disposed at the intersection of row $1r$ and column $1c$ and the intersection of row $1r$ and column $6c$ in FIG. 5) that gives a bonus to another user when the building object is destroyed during a battle by that user attacking the own object. For instance, when an own defensive equipment object DOa that gives the bonus is destroyed during a battle, a predetermined portion of a participation parameter (e.g., an energy parameter) that is required when the user participates to a battle game on offense, may be given to another user who has been successful in the destruction. For instance, the predetermined portion that is given to a user who has been successful in the destruction may be calculated based on an assessment value (e.g., a rate parameter described below) of that user, or may be calculated so that the predetermined portion that is given to the user is increased with an increase in the assessment value. It should be noted that as another example, when an own defensive equipment object DOa that gives the bonus is destroyed during a battle, the user suffering the destruction may be deprived of a predetermined portion of the participation parameter in addition to the bonus.

Own defensive equipment objects DOa can be moved (e.g., dragged) according to the user's operation (e.g., a drag operation on a touch panel) and disposed again in the defense map area DAp, if during map editing, except for on a terrain object N. However, own defensive equipment objects DOa function as an object for defense in the defense map area DAp, and therefore, cannot be moved into the offense map area AAp or the neutral map area NAp.

An equipment object that is disposed as an own defensive equipment object DOa in the defense map area DAp can be newly generated or upgraded during map editing. For instance, as shown in FIGS. 4 and 5, on the display screen for map editing, an "equipment generation/enhancement" operation button B is provided for generating or upgrading an equipment object. By performing an operation of choosing the "equipment generation/enhancement" operation button B, an equipment object possessed by the user themselves can be newly added, or an equipment object possessed by the user themselves or an equipment object disposed on a game map (defense map area DAp) may be upgraded.

Own defensive player objects DOb are a player object that fights against another user's object (offensive object). A plurality of (e.g., four) own defensive player objects DOb are previously chosen from characters possessed by the user and are organized as a defensive troop. The objects previously organized as a troop are disposed in the defense map area DAp, except for on a terrain object N, and serve as an own defensive player object DOb. Here, an area where an own defensive player object DOb can be disposed may be further limited in the defense map area DAp. For instance, the area where an own defensive player object DOb can be disposed may be limited to the first and second rows (rows $1r$ and $2r$) in the defense map area DAp. This can provide a space between an own defensive player object DOb and an offensive object on a game map, and therefore, the situation that a battle opponent attacks immediately after the start of a battle can be avoided.

For an own defensive player object DOb that appears in the game of this non-limiting example, a plurality of ability values are set that are used when the own defensive player object DOb fights against an offensive object of another user as a battle opponent. For instance, for each player object, ability values indicating a hit point (HP: lethal offensive power), offensive power, defensive strength, speed, magic offensive power, etc., are set. Own defensive player objects DOb can attack another user's offensive object, defend against an attack from another user's offensive object, and move on a game map, depending on the ability values. When the value of HP of an own defensive player object DOb is lowered to a threshold (e.g., the value of HP is lowered to zero), the own defensive player object DOb disappears from a game map.

Own defensive player objects DOb can be moved (e.g., dragged) according to the user's operation (e.g., a drag operation on a touch panel) and disposed again in the defense map area DAp, if during map editing, except for on a terrain object N. However, own defensive player objects DOb function as an object for defense in the defense map area DAp, and therefore, cannot be moved into the offense map area AAp or the neutral map area NAp.

As shown in FIG. 5, an equipment object possessed by the user themselves can be disposed in the offense map area AAp of the game map during map editing. By disposing an equipment object possessed by the user themselves in the offense map area AAp, the equipment object is allowed to function as an own offensive equipment object AOa. In this case, the own offensive equipment object AOa, when fighting against another user's object (defensive object), serves as an offensive object that attacks the opponent's territory.

For instance, own offensive equipment objects AOa include a building object and weapon object that cause damage to another user's object (defensive object) disposed in a predetermined range, and increase/restore an ability of an own object (offensive object) disposed in a predetermined range, to enhance offensive power, etc. For instance, as shown in FIGS. 4 and 5, on a display screen for map editing, an "equipment disposition" operation button B is provided for calling an equipment object possessed by the user themselves and disposing the equipment object on a game map (the offense map area AAp). By performing an operation of choosing the "equipment disposition" operation button B, an equipment object to be disposed on a game map (the offense map area AAp) can be chosen from those possessed by the user themselves.

Own offensive equipment objects AOa can be moved (e.g., dragged) according to the user's operation (e.g., a drag operation on a touch panel) and disposed again in the offense map area AAp, if during map editing, except for on a terrain object N. However, own offensive equipment objects AOa function as an object for offense in the offense map area AAp, and therefore, cannot be moved into the defense map area DAp or the neutral map area NAp.

Here, as can be seen from in FIGS. 4 and 5, in the offense map area AAp, no terrain object N is disposed, on which a player object or equipment object possessed by the user themselves cannot be disposed. In other words, there is a limitation on the disposition of a defensive object due to a terrain object N in the defense map area DAp, and there is not a limitation on the disposition of an offensive object due to a terrain object N in the offense map area AAp. Thus, in the offense map area AAp, there is not a limitation on the disposition of an offensive object due to a terrain object N, and therefore, a battle can be performed with the previous disposition of an offensive object remaining unchanged, even when a battle opponent uses any map (e.g., a defense map area DAe described below). The offense map area AAp, where the user is allowed to dispose an offensive object, does not overlap the defense map area DAp, where the user is allowed to dispose a defensive object, and therefore, display that is easy for the user to see can be provided. Furthermore, by providing the neutral map area Nap, where an offensive object or defensive object cannot be disposed, between the offense map area AAp and the defense map area DAp, an offensive troop and a defensive troop can be more easily distinguished from each other, and as shown in FIG. 5, labels indicating the offense map area and the defense map area, respectively, can be displayed in the neutral map area NAp.

An equipment object that is disposed as an own offensive equipment object AOa in the offense map area AAp can be newly generated or upgraded during map editing. For instance, as shown in FIGS. 4 and 5, by performing an operation of choosing the "equipment generation/enhancement" operation button B provided on the display screen for map editing, an equipment object possessed by the user themselves can be newly added, or an equipment object possessed by the user themselves or an equipment object disposed on a game map (in the offense map area AAp) can be upgraded.

When the user of the information processing apparatus 3 has ended map editing, the game map thus edited (typically, the defense map area DAp produced by the user performing map editing) is transmitted to the server 200 and temporarily stored in the storage nit 203, i.e. registered. Thereafter, by accessing the server 200, another user who operates another information processing apparatus 3 can perform a battle game in which the second user's offensive object, on offense, attacks the game map (the defense map area DAp) registered in the server 200.

A plurality of (e.g., four) own offensive player objects AOb, which are a player object that fights against another user's object (defensive object), are previously chosen as a defensive troop from objects possessed by the user, and a plurality of such defensive troops are previously organized. It should be noted that one offensive troop that is to participate in a battle game is chosen by the user from objects previously organized in troops (a plurality of offensive troops), and is disposed in the offense map area AAp (specifically, the offense map area AAp to which the neutral map area NAp has been changed), and therefore, player objects in the offensive troop function as an own offensive player object AOb. However, during map editing, an own offensive player object AOb cannot be disposed, and after a battle opponent is determined, one is chosen from the plurality of offensive troops, and is disposed in the offense map area AAp to which the neutral map area NAp has been changed. Thereafter, the own offensive player object AOb serves as an offensive object that attacks an opponent's territory in a battle against another user's object (defensive object).

By choosing "fight against another user" in the menu of the battle game, the user of the information processing apparatus 3 can fight against another user using the edited game map. For instance, when the user of the information processing apparatus 3 chooses "fight against another user", the user of the information processing apparatus 3, on offense, can fight against another user by consuming a participation parameter (e.g., an energy parameter) corresponding to the assessment value (e.g., a rate parameter described below) of the user. It should be noted that the amount of the participation parameter (energy parameter) consumed by performing the battle may be set to a greater value as the user has a greater assessment value (e.g., a rate parameter described below). In this case, if the participation parameter (possessed amount) possessed by the user is smaller than an amount (consumed amount) that is to be consumed in the battle, the user cannot fight, on offense, against another user. The participation parameter possessed by the user can spontaneously increase as time passes, or can be acquired, depending on the result of a battle against another user (e.g., destruction of a defensive equipment that gives a bonus). Therefore, the user increases the participation parameter using any of such means in order to participate in a battle game on offense.

When the user of the information processing apparatus 3 participates in a battle on offense, an offensive object disposed in the offense map area AAp prepared by the user performing map editing, and a defensive object disposed in the defense map area DAe prepared by another user performing map editing, are combined on a single game map, and fight against each other. Specifically, when the user of the information processing apparatus 3 chooses "fight against another user" in the menu of the battle game, the participation parameter is consumed and thereafter the server 200 matches the user of the information processing apparatus 3 up with a battle opponent which is another user, and the battle opponent is displayed. It should be noted that as described below, as the battle opponent matched up by the server 200, a battle opponent varying depending on a season in which a battle game is performed (specifically, a set of a defensive troop, defensive equipment, and defense game map set in the season including the current time) is chosen. Thereafter, the user of the information processing apparatus 3 observes the battle opponent's game map (i.e., the defense map area DAe where another user's defensive object is disposed) which is registered in the server 200, and starts a battle between the user's offensive object and the battle opponent's defensive object.

As shown in FIG. 6, when a game starts in which the user of the information processing apparatus 3 fights, on offense, against another user, a game map in which the offense map area AAp (and the neutral map area NAp) in which an offensive object has been disposed by the user of the information processing apparatus 3 performing map editing and the defense map area DAe in which a defensive object has been disposed by another user performing map editing are combined, is generated as a game map for a battle. In other words, the user's offensive object (own offensive equipment object AOa) previously disposed in the offense map area AAp by map editing, and another user's defensive object (an opponent defensive equipment object EOc and an opponent defensive player object EOd) previously disposed in the defense map area DAe by map editing, fight against each other.

In a game map that is produced during the start of a game in which the user of the information processing apparatus 3 fights against another user, the neutral map area NAp (i.e., the seventh row (row 7r) in the grid-pattern area of the game map) is changed to an offense map area AAp. The user, on offense, is allowed to newly dispose one offensive troop (e.g., four objects) chosen by the user themselves from the plurality of offensive troops previously organized, as an own offensive player object AOb, in the offense map area AAp replacing the neutral map area NAp. It should be noted that as described below, as options, i.e., offensive troops, to be chosen and disposed as an own offensive player object AOb, offensive troops varying depending on a season in which a battle game is performed (specifically, offensive troops previously set for the season including the current time) are presented. The own offensive player object AOb thus added serves as an offensive object that attacks another user's defensive object. Specifically, while the user's own offensive equipment object AOa disposed in the offense map area AAp, and another user's opponent defensive equipment object EOc and opponent defensive player object EOd disposed in the defense map area DAe, need to be previously set without knowing a battle opponent, the user is allowed to newly dispose an own offensive player object AOb in the offense map area AAp, i.e., choose one from the plurality of offensive troops for the season including the current time, and dispose each object included in the troop in the game map, after viewing the line-up of battle opponents.

When the user of the information processing apparatus 3 is competing against another user, the user of the information processing apparatus 3 is allowed to choose an object to be operated in the player's turn from a plurality of own offensive player objects AOb by performing a predetermined operation using the input unit 34. Thereafter, the user is allowed to move the own offensive player object AOb to be operated, on a game map, and cause the own offensive player object AOb to attack the battle opponent's defensive object (an opponent defensive equipment object EOc and an opponent defensive player object EOd) on the game map, by performing a predetermined operation. Here, the distance that an own offensive player object AOb can be moved on a game map in a single player's turn is limited, and the user is allowed to move an own offensive player object AOb within the limitation in the player's turn. It should be noted that the distance that an own offensive player object AOb can be moved on a game map in a single player's turn may be set for each of the attribute, ability, etc., of the own offensive player object AOb. In the case where a game map is formed of grid-pattern cells in which each object can be disposed, the limited distance (maximum movement distance) that an own offensive player object AOb can be moved on a game map in a single player's turn may be defined using the number of cells, e.g. may be set so that an own offensive player object AOb can be moved by 1-3 cells, depending on each of the attribute, ability value, etc., thereof.

An own offensive player object AOb can attack, in the player's turn, the battle opponent's defensive object, depending on a positional relationship between these objects. For instance, if the positional relationship between an own offensive player object AOb to be operated and a defensive object is such that the distance therebetween allows the own offensive player object AOb to attack the defensive object (e.g., a positional relationship (distance) in which the own offensive player object AOb and the defensive object are adjacent to each other), the user is allowed to attack the defensive object by performing a predetermined operation. When a life parameter (e.g., a hit point) possessed by the defensive object is exceeded by the attack effect of the own offensive player object AOb (the hit point of the defensive object becomes zero), the defensive object is toppled or destroyed and disappears from the game map. It should be noted that the maximum attack distance in which an own offensive player object AOb can attack a defensive object may be set for each of the attribute, ability value, etc., of the own offensive player object AOb. The maximum attack distance may be set so that even when an own offensive player object AOb is located away from a defensive object on a game map, then if the distance therebetween is within the maximum attack distance, the own offensive player object AOb can attack the defensive object. For instance, in the case where a game map is formed of grid-pattern cells in which each object can be disposed, the maximum attack distance may be set so that an own offensive player object AOb can attack a defensive object located 1 or 2 cells away from the own offensive player object AOb, depending on each of the attribute and ability value of the own offensive player object AOb.

During the start or end of the player's turn, an own offensive equipment object AOa automatically exerts an effect possessed by the own offensive equipment object AOa on a game map. For instance, an own offensive equipment object AOa causes damage to a defensive object disposed within a predetermined range, or increases/restores the ability of an own offensive player object AOb disposed within a predetermined range to enhance the offensive power of the own offensive player object AOb.

When all offensive objects disposed on a game map have ended their actions (movement, offense, defense, waiting, etc.) or when the user performs a predetermined operation (e.g., an operation of choosing an "end turn" operation button to instruct to end a turn; by this operation, it is assumed that all offensive objects have ended their actions), the player's turn ends, and the opponent's turn (defense turn) starts. For instance, in the opponent's turn, the control unit 31 performs control so that an opponent defensive player object EOd moves on a game map, and an opponent defensive equipment object EOc and an opponent defensive player object EOd attack an own offensive equipment object AOa and an own offensive player object AOb on the game map. For instance, when a positional relationship between an opponent defensive equipment object EOc or an opponent defensive player object EOd, and an own offensive player object AOb, is such that the distance therebetween allows the opponent defensive equipment object EOc or opponent defensive player object EOd to attack the own offensive player object AOb, the control unit 31 may perform control so that the opponent defensive equipment object EOc or opponent defensive player object EOd attacks the own offensive player object AOb. When a life parameter (e.g., a hit point) possessed by the own offensive player object AOb is exceeded by the attack effect of the opponent defensive equipment object EOc or opponent defensive player object EOd (the hit point of the own offensive player object AOb becomes zero), the own offensive player object AOb is toppled and disappears from the game map. When a positional relationship between an opponent defensive equipment object EOc or an opponent defensive player object EOd, and an own offensive equipment object AOa, is such that the distance therebetween allows the opponent defensive equipment object EOc or opponent defensive player object EOd to attack the own offensive equipment object AOa, the control unit 31 may perform control so that the opponent defensive equipment object EOc or opponent defensive player object EOd to attack the own offensive equipment object AOa. When a withstanding parameter (e.g., a hit point) possessed by the own offensive equipment object AOa is exceeded by the attack effect of the opponent defensive equipment object EOc or opponent defensive player object EOd, the own offensive equipment object AOa is destroyed and the presence of the own offensive equipment object AOa is made ineffective on the game map.

When all defensive objects disposed on the game map have ended their actions, the opponent's turn ends, and the player's turn starts again. The above battle game proceeds by such alternation of the player's turn and the opponent's turn, and ends when a predetermined number of turns have been performed. When all opponent defensive player objects EOd have been defeated before the predetermined number of turns is reached, the user of the information processing apparatus 3, on offense, wins, and another user as a battle opponent, on defense, loses. When at least one opponent defensive player object EOd is alive after the predetermined number of turns have been performed, another user as a battle opponent, on defense, wins, and the user of the information processing apparatus 3, on offense, loses.

The user of the information processing apparatus 3 may be on defense in the battle game when the server 200 matches the user of the information processing apparatus 3 up, as a battle opponent, with another user. When the user of the information processing apparatus 3, on defense, is matched up with another user, a battle game is performed with a defensive object set for the season including the current time of the defensive objects disposed in the defense map area DAp which have been produced by the user of the information processing apparatus 3 performing map editing and registered in the server 200, and an offensive object disposed in the offense map area AAe which has been produced by the second user performing map editing, combined on a single game map.

As shown in FIG. 7, when a game is started where the user of the information processing apparatus 3 is on defense and fights against another user, a game map on which the defense map area DAp set for the season including the current time of the defense map area DAp in which a defensive object is disposed by the user of the information processing apparatus 3 performing map editing, and the offense map area AAe for the season including the current time in which an offensive object is disposed by another user, are combined is generated as a game map for a battle. Specifically, the user's defensive object for the season including the current time (an own defensive equipment object DOa and an own defensive player object DOb) previously disposed in the defense map area DAp by map editing fights against another user's offensive object for the season including the current time (an opponent offensive equipment object EOa) previously disposed in the offense map area AAe by map editing. Thereafter, when the second user as a battle opponent additionally disposes an opponent offensive player object EOb for the season including the current time as an offensive object that attacks a defensive object, a battle game in which the user of the information processing apparatus 3 is on defense is started. It should be noted that the battle game in which the user of the information processing apparatus 3 is on defense proceeds in a manner similar to that of the above battle game in which the user of the information processing apparatus 3 is on offense, except that an entity that controls objects is changed, and therefore, will not be described in detail. Briefly, an offensive object on a game map is operated according to an operation performed by another user as a battle opponent's in the player's turn (offense turn), and a defensive object (an own defensive equipment object DOa and an own defensive player object DOb) in the defense map area DAp previously set by the user of the information processing apparatus 3 performing map editing and registered in the server 200 is operated according to control performed by the control unit 31 in the opponent's turn (defense turn).

Next, a season in which a battle game is performed will be described. As shown in FIG. 8, in the battle game, a season 1 and a season 2 are alternately set without overlapping. For instance, the season 1 is a period of time during which an ability of an object belonging to an attribute A in an offensive troop (own offensive player objects AOb and opponent offensive player objects EOb) performing a battle game is allowed to be enhanced, and a period of time during which an ability of an object belonging to an attribute a in a defensive troop (own defensive player objects DOb and opponent defensive player objects EOd) performing the battle game is allowed to be enhanced. The season 2 is a period of time during which an ability of an object belonging to an attribute B in an offensive troop performing a battle game is allowed to be enhanced, and a period of time during an ability of an object belonging to an attribute b in a defensive troop performing the battle game is allowed to be enhanced. Therefore, when a battle game is performed in the season 1, it is advantageous to the user, on offense, to put an object belonging to the attribute A into an offensive troop, and it is advantageous to the user, on defense, put an object belonging to the attribute a into a defensive troop. When a battle game is performed in the season 2, it is advantageous to the user, on offense, to put an object belonging to the attribute B into an offensive troop, and it is advantageous to the user, on defense, to put an object belonging to the attribute b into a defensive troop. It should be noted that in this non-limiting example, the season 1 is used as a non-limiting example of a first period of time, and the season 2 is used as a non-limiting example of a second period of time.

In addition, in this non-limiting example, a bonus object may be set whose ability value and acquired rate parameter, etc., are increased when participating in a battle game in a predetermined season (bonus season) more than in another season. For the bonus object, the ability value and acquired rate parameter, etc., thereof are increased only in the above predetermined season irrespective of the attribute thereof or other objects belonging in the same troop. A bonus object is set for each season.

In a battle game of this non-limiting example, an offensive troop and a defensive troop to be used for each season can be previously organized. For instance, a plurality of offensive troops that are to participate in a battle game can be previously organized for each season, i.e., offensive troops for the season 1 and offensive troops for the season 2 can be prepared. During the start of a battle game, offensive troops corresponding to a season in which the battle game is performed are presented as options to the user, and a chosen offensive troop participates in the battle game. A predetermined number (e.g., one) of defensive troops that are to participate in a battle game can be organized for each season, with the defensive troops disposed together with defensive equipment on a game map (defensive unit described below), and are registered as a defensive troop for the season 1 and a defensive troop for the season 2 in the server 200. It should be noted that in this non-limiting example, an offensive troop for the season 1 is used as a non-limiting example of a first group, and an offensive troop for the season 2 is used as a non-limiting example of a second group. In addition, in this non-limiting example, as a non-limiting example of contents constituting a group, player objects belonging to the group are used. It should be noted that in this non-limiting example, player objects belonging to an offensive troop is used as a non-limiting example of contents on offense constituting the first group and contents on offense constituting the second group. An offensive equipment object may be included in the contents on offense. In addition, in this non-limiting example, player objects belonging to a defensive troop are used as a non-limiting example of contents on defense constituting a first group and contents on defense constituting a second group. A defensive equipment object may be included in the contents on defense.

Next, a non-limiting example game process in which an offensive troop is organized before the start of a battle game will be described with reference to FIG. 9. In FIG. 9, as described above, in a battle game of this non-limiting example, a plurality of objects possessed by the user can be caused to appear as an offensive troop or defensive troop in a game, and fight against an opponent object. For instance, the user moves any of a plurality of objects disposed in a possessed object area into a troop organization area according to an operation to organize an offensive troop or defensive troop. In the non-limiting example of FIG. 9, an offensive troop including a plurality of objects (e.g., four objects) can be provided in the troop organization area according to the user's operation. A plurality of offensive troops can be previously organized for each season (e.g., five offensive troops for the season 1, and five offensive troops for the season 2). When a predetermined mission starting operation is performed, a plurality of offensive troops organized for the season including the time of making a mission are presented as options to the user, and the battle game is performed with one chosen from the plurality of offensive troops participating in the battle game.

In the non-limiting example of FIG. 9, a non-limiting example screen for organizing a troop 1 that is one of the offensive troops for the season 1 is shown. For objects appearing in a battle game of this non-limiting example, a plurality of ability values that are used in fighting against an opponent object are set. For instance, for each object, ability values indicating an HP, offensive power, defensive strength, speed (e.g., the number of squares by which an object can be moved in a single turn), magic defensive strength, etc., are set. Objects that appear in the game of this non-limiting example are roughly divided into giver objects, recipient objects, and non-giver, non-recipient objects. A giver object can increase an ability of a recipient object if an attribute to which the giver object belongs corresponds to (e.g., is identical to) an attribute to which the recipient object belongs. A recipient object, which belongs to a predetermined attribute, is given an ability by a giver object if the predetermined attribute corresponds to (e.g., is identical to) an attribute of the giver object. A non-giver, non-recipient object is another object that is neither a giver object nor a recipient object, and is never given an ability by a giver object.

An object C1 shown in FIG. 9 is a giver object, which can increase an ability of a recipient object in the above battle game if a predetermined condition is satisfied. For instance, the giver object C1 is displayed and assigned a label G1 indicating an attribute "A". Here, an attribute to increase an ability of a recipient object is one that is chosen from a plurality of attributes, e.g., four attributes "A", "B", "a", and "b". A giver object also has at least one parameter to increase an ability of a recipient object. A parameter to increase an ability of a recipient object is chosen from a plurality of parameters, e.g., four ability increase items "offensive power", "defensive strength", "speed", and "magic defensive strength". All giver objects may additionally have a common parameter to increase an ability of a recipient object. For instance, such a common increase parameter is an ability increase item "HP". It should be noted that an attribute to increase an ability of a recipient object that is set in a giver object may be a category (attribute) to which the giver object belongs.

An object C2 shown in FIG. 9 is a recipient object, which is given an ability by a giver object if a predetermined condition is satisfied. More specifically, the recipient object C2 is displayed and assigned a label I1 indicating the attribute "A". For instance, when a recipient object belonging to the attribute "A" performs a battle game in the season 1 with the recipient object belonging to the same offensive troop as that of a giver object belonging to the attribute "A", the recipient object is given by the giver object an ability value corresponding to an ability increase item set for the giver object, and the recipient object performs the battle game with the ability value increased. In the non-limiting example of FIG. 9, the recipient object C2 belonging to the attribute "A" is organized together with the giver object C1 belonging to the same attribute "A" into the same offensive troop (troop 1) for the season 1. Therefore, when a battle game is performed during the season 1, an ability value of the recipient object C2 corresponding to an ability increase item inherently set for the giver object C1, and an ability value of the recipient object C2 corresponding to an ability increase item common to each giver object, are increased during the battle game.

An ability given to a recipient object by a giver object is effective as long as the recipient object and the giver object participate in a battle in the same troop, and a battle game is performed in a season in which an attribute (i.e., an ability) of the objects is enhanced. In other words, an ability given to a recipient object by a giver object is effective during a battle game irrespective of the positional relationship and motions of the giver object and the recipient object. Therefore, in this non-limiting example, if, after two objects in a troop have started a battle game, the objects are in a predetermined positional relationship in a virtual world (e.g., the objects are located adjacent to each other or at the same position), an ability of at least one of the objects may be increased. In that case, the efficacy of giving an ability to a recipient object by a giver object is performed separately from the increase of an ability depending on the positional relationship. It should be noted that if, in a battle after a giver object and a recipient object have participated in a battle game in the same troop, the giver object is defeated and can no longer fight, an ability given to the recipient object by the giver object may be made ineffective, or may be effective until the battle ends.

An object C3 shown in FIG. 9 is a recipient object, which is given an ability by a giver object if a predetermined condition is satisfied. In a non-limiting example, the recipient object C3 belongs to the attribute "a". When the recipient object C3 participates in a battle game in the season 1 in the same defensive troop as that of a giver object belonging to the attribute "a", the recipient object C3 is given by the giver object an ability value corresponding to an ability increase item set for the giver object, so that the ability value is increased. However, in the non-limiting example of FIG. 9, the recipient object C3 belonging to the attribute "a" belongs to the same troop as that of the giver object C1 belonging to the different attribute "A", and therefore, even the recipient object C3 is not given an ability by the giver object C1 if a condition is not satisfied. In addition, even if the recipient object C3 belonging to the attribute "a" belongs to the same offensive troop as that of a giver object having the same attribute "a", the troop to which the recipient object C3 belongs is not a defensive troop, and therefore, the recipient object C3 is not given an ability by the giver object irrespective of whether the battle game is performed in the season 1 or in the season 2.

An object C4 shown in FIG. 9 is a non-giver, non-recipient object. In the non-limiting example of FIG. 9, the non-giver, non-recipient object C4 makes a mission along with the giver object C1 belonging to the attribute "A". However, since the non-giver, non-recipient object C4 does not belong to any attribute, an ability is not given to the non-giver, non-recipient object C4 by the giver object C1.

In addition, in the offensive troop organization screen for the season 1 shown in FIG. 9, season notification information S indicating a season including the current time, i.e., the time of organization (in the non-limiting example of FIG. 9, the season 1). In addition, the offensive troop organization screen for the season 1 shows rate information R indicating a maximum acquired rate parameter (maximum acquisition user assessment value) that may be obtained when a battle game is performed by an offensive troop being organization in the season 1. It should be noted that in a battle game of this non-limiting example, the larger the number of participating objects that belong to an attribute advantageous to a season in which the battle game is performed participate, or the larger the number of participating recipient objects that are given an ability by a giver object in a season in which the battle game is performed, the greater the rate parameter that can be obtained in the battle game. The rate information R indicates a maximum acquired rate parameter based on a season in which an offensive troop being organized is to be used (in the non-limiting example of FIG. 9, the season 1 because of the offensive troop organization screen for the season 1). In addition, as described above, in a battle game of this non-limiting example, a bonus object that increases a rate parameter which can be acquired in a predetermined bonus season may be set, and if the nearest season in which an offensive troop being organized is to be used (in the non-limiting example of FIG. 9, the season 1 includes the time of organization, and an offensive troop for the season 1 is being organized, and therefore, that season corresponds to the season including the time of organization) is a bonus season, a maximum acquired rate parameter for which the increase by organization of the bonus object is taken into account is shown in the rate information R. Thus, in the offensive troop organization screen for the season 1, when an object disposed in the troop organization area is replaced by another object, the maximum acquired rate parameter obtained in the season 1, which is indicated by the rate information R, may be changed. Therefore, based on the maximum acquired rate parameter indicated by the rate information R, it can be determined whether an offensive troop is good or bad. It should be noted that the rate parameter and its change in a battle game will be described in detail below. It should be noted that in this non-limiting example, the rate information R is used as a non-limiting example of information about an effect obtained in a game process.

Next, a non-limiting example game process in which an offensive troop for the season 2 is organized before the start of a battle game will be described with reference to FIG. 10. In the non-limiting example of FIG. 10, a non-limiting example screen for organizing a troop 3 that is one of offensive troops for the season 2 is shown.

An object C5 shown in FIG. 10 is a giver object. In a non-limiting example, the giver object C5 is displayed and assigned a label G2 indicating an attribute "B". An object C6 is a recipient object. The recipient object C6 is displayed and assigned a label I3 indicating the attribute "B". For instance, when a recipient object belonging to the attribute "B" performs a battle game in the season 2 with the recipient object belonging to the same offensive troop as that of a giver object belonging to the attribute "B", the recipient object is given by the giver object an ability value corresponding to an ability increase item set for the giver object, and performs the battle game with the ability value increased. In the non-limiting example of FIG. 10, the recipient object C6 belonging to the attribute "B" and the giver object C5 belonging to the same attribute "B" are organized together into the same offensive troop (i.e., a troop 3) for the season 2. Therefore, when a battle game is performed during the season 2, an ability value of the recipient object C6 corresponding to an ability increase item inherently set for the giver object C5, and an ability value of the recipient object C5 corresponding to an ability increase item common to each giver object, are increased during the battle game.

An object C7 shown in FIG. 10 is a recipient object. The recipient object C7 belongs to an attribute "A". When the recipient object C7 participates in a battle game during the season 1 in the same offensive troop as that of a giver object belonging to the attribute "A", the recipient object C7 is given by the giver object an ability value corresponding to an ability increase item set for the giver object, and the ability value is increased. However, in the non-limiting example of FIG. 10, the recipient object C7 belonging to the attribute "A" belongs to the same troop as that of the giver object C5 belonging to the different attribute "B", and therefore, even recipient object C7 is not given an ability by the giver object C5, if a condition is not satisfied. In addition, even if the recipient object C7 belonging to the attribute "A" belongs to the same offensive troop as that of a giver object belonging to the same attribute "A", the organization screen of FIG. 10 indicates an offensive troop for the season 2, and therefore, is not an offensive troop that participates in a battle game during the season 1, and as a result, the recipient object C7 is not given an ability by the giver object.

An object C8 shown in FIG. 10 is a non-giver, non-recipient object. In the non-limiting example of FIG. 10, the non-giver, non-recipient object C8 makes a mission along with the giver object C5 belonging to the attribute "B". However, the non-giver, non-recipient object C8 does not belong to any attribute, and therefore, is not given an ability by the giver object C5.

In addition, the offensive troop organization screen for the season 2 illustrated in FIG. 10 shows the season notification information S for the season including the current time, i.e., the time of organization (in the non-limiting example of FIG. 10, the season 1). Thus, in the non-limiting example of FIG. 10, the season in which an offensive troop being organized is to be used is different from the season in which the organization is being performed. However, in this non-limiting example, a troop for a season different from the season including the time of organization can be previously organized and set. Thus, if the season in which an offensive troop being organized is to be used is different from the season in which the organization is being performed, the offensive troop organization screen shows a parameter based on the season in which an offensive troop being organized is to be used. Specifically, in the offensive troop organization screen for the season 2 of FIG. 10, even when organization is being performed in the season 1, a parameter based on the assumption that a battle game is to be performed in the season 2 is shown. For instance, in the offensive troop organization screen for the season 2, even when organization is being performed during the season 1, the rate information R indicating a maximum acquired rate parameter (maximum acquisition user assessment value) obtained in a battle game during the season 2 is shown, based on the assumption that a battle game is to be performed during the season 2 using an offensive troop being organized. As described above, in a battle game of this non-limiting example, a bonus object that increases a rate parameter which can be acquired may be set during a predetermined bonus season, and if the nearest season in which an offensive troop being organized is to be used (in the non-limiting example of FIG. 10, the season 1 includes the time of organization, and an offensive troop for the next coming season 2 is being organized, and therefore, that season corresponds to the next season coming after the season including the time of organization) is the bonus season, a maximum acquired rate parameter for which the increase by organization of the bonus object is taken into account is shown in the rate information R. Thus, in the offensive troop organization screen for the season 2, even when the time of organization is not included in the season 2, then if an object disposed in the troop organization area is replaced by another object, the maximum acquired rate parameter obtained in the season 2, which is indicated by the rate information R, may be changed. Therefore, based on the maximum acquired rate parameter indicated by the rate information R, it can be determined whether an offensive troop for the season 2, which is not the season including the time of organization, is good or bad.

It should be noted that in the above non-limiting examples, if the season in which organization is being performed is different from the season in which an offensive troop being organized is to be used, the maximum acquired rate parameter (maximum acquisition user assessment value) that may be obtained when an offensive troop being organized participates in a battle game, based on the season in which the offensive troop is to be used (i.e., the season different from the season in which organization is being performed), is shown. However, in another non-limiting example, if the season in which organization is being performed is different from the season in which an offensive troop being organized is to be used, the maximum acquired rate parameter that may be obtained when an offensive troop being organized participates in a battle game in the season in which organization is being performed may be shown. Alternatively, the maximum acquired rate parameter that may be obtained when an offensive troop participates in a battle game may not be shown. In another non-limiting example, even if the season in which organization is being performed is the same as the season in which an offensive troop being organized is to be used, then when the next coming same season (e.g., the same season after the next season) is assumed, the maximum acquired rate parameter that may be obtained when an offensive troop being organized participates in a battle game may not be shown.

In a battle game of this non-limiting example, as described above, a plurality of objects possessed by the user can appear as a defensive troop in the game and fight against opponent objects. A game process in which the defensive troop is organized can be similarly performed in a manner similar to that for an offensive troop, except that a different number of troops can be set, and a defense failure rate is shown as the rate information R. Specifically, defensive troops used in a battle game of this non-limiting example may be previously organized, one troop for each season (e.g., a defensive troop for the season 1, and a defensive troop for the season 2). A defensive troop organization screen shows, as the rate information R, a maximum lost rate parameter (loss user assessment value; defense failure rate) that may be decreased when the defensive troop fails to defend in a battle game during the season, on the assumption that a battle game is performed in the season in which a defensive troop being organized is to be used. It should be noted that a method for organizing a defensive troop used in a battle game of this non-limiting example is similar to that for an offensive troop described above, and therefore, will not be described in detail.

It should be noted that in an organization screen in which an offensive troop or defensive troop is organized, in the case where an ability of an object belonging to a troop being organized is changed when the object is used in the season for which organization is intended, at least an ability value obtained as a result of the changing may be displayed on the organization screen. By thus displaying an ability value of an object changed when the object is put into a troop during organization, it can be determined whether the use of the troop in a battle game is advantageous or disadvantageous.

Next, offensive troops presented as options to the user, on offense, and defensive troops, defensive equipment, and a game map chosen by the server 200, on defense, when a battle game is performed, will be described with reference to FIG. 11.

As shown in FIG. 11, when the user of the information processing apparatus 3 participates, on offense, in a battle game, a defensive unit (a set of a defensive troop, defensive equipment, and a game map) for a season in which the battle game is performed, which has been set and registered in the server 200 by another user, is shown. Thereafter, the information processing apparatus 3 prompts the user of the information processing apparatus 3 to choose one from a plurality of offensive troops set by the user for a season in which a battle game is performed, and a battle game is performed between the chosen offensive troop and a defensive troop indicated by the server 200.

Specifically, in the case where a battle game is performed in the season 1, a set of defensive units (a set of a defensive troop for the season 1, defensive equipment for the season 1, and a defense game map for the season 1 set and registered by another user) registered by the server 200 for the season 1 of another user's defensive units is presented to the user of the information processing apparatus 3 that participates, on offense, in a battle game. The information processing apparatus 3 also presents a plurality of offensive troops (e.g., five offensive troops for the season 1) previously organized and set by the user of the information processing apparatus 3 for the season 1, and prompts the user to choose one that is to participate in a battle game from the plurality of offensive troops for the season 1. After an offensive troop for the season 1 has thus been chosen, the information processing apparatus 3 starts a battle game between the offensive troop for the season 1 and the defensive unit for the season 1 presented by the server 200. It should be noted that offense equipment (own offensive equipment object AOa) used in a battle game by the user, on offense, of the information processing apparatus 3, and the arrangement thereof, may be common to all seasons.

In the case where a battle game is performed in the season 2, a set of defensive units (a set of a defensive troop for the season 2, defensive equipment for the season 2, and a defense game map for the season 2 set and registered by another user) registered by the server 200 for the season 2 of another user's defensive units is presented to the user of the information processing apparatus 3 that participates, on offense, in a battle game. The information processing apparatus 3 also presents a plurality of offensive troops (e.g., five offensive troops for the season 2) previously organized and set by the user of the information processing apparatus 3 for the season 2, and prompts the user to choose one that is to participate in a battle game from the plurality of offensive troops for the season 2. After an offensive troop for the season 2 has thus been chosen, the information processing apparatus 3 starts a battle game between the offensive troop for the season 2 and the defensive unit for the season 2 presented by the server 200.

A plurality of offensive troops previously set by the user for the season including the current time are presented and displayed in any suitable form that an offensive troop organized for that season is presented as an option with a higher priority than that of other offensive troops.

In a first non-limiting example, of offensive troops previously organized by the user for use in the season 1, and offensive troops previously organized by the user for use in the season 2, only offensive troops organized for use in the season including the current time may be presented as options. For instance, FIG. 12 shows a non-limiting example screen in which when the season including the current time is the season 1, one or more of the offensive troops organized for the season 1 that are allowed to participate in a battle game are shown as options. The offensive troop choice screen of FIG. 12 shows the season notification information S indicating a season in which a battle game is performed, and the rate information R indicating the maximum rate parameter that may be obtained when an offensive troop shown as an option makes a mission. The offensive troop choice screen shows, as an option, one (offensive troop 1) chosen from the offensive troops for the season 1 previously organized by the user. By performing an operation of choosing an option change button Bs provided on the left and right sides of the option, a different offensive troop is shown as an option. Here, in the case of the above first non-limiting example, an option shown in the offensive troop choice screen is always chosen from the offensive troops previously organized for the season 1 by the user, but not from the offensive troops previously organized for the season 2 by the user. Therefore, in the above offensive troop choice screen, offensive troops organized for the season 1 are presented with a higher priority than that of other offensive troops. In the offensive troop choice screen, by performing an operation of choosing an option determination button Bf, an offensive troop displayed in the screen is determined as an offensive troop that is to participate in a battle game. In addition, in the offensive troop choice screen, by performing an operation of choosing an option choice cancel button Bb, the process of choosing the offensive troop is ended, and control returns to the previous process. Thus, according to the option presentation display form of the above first non-limiting example, offensive troops are exactly separated according to season, and therefore, an offensive troop organized by the user and intended to be used in another season can be prevented from being erroneously chosen.

In a second non-limiting example, in the case where offensive troop options are sequentially displayed on a troop-by-troop basis, offensive troops previously organized by the user for use in the season including the current time may be displayed as options earlier than other offensive troops. In a third non-limiting example, offensive troops previously organized by the user for use in the season including the current time may be displayed in a form different from that for other offensive troops. For instance, while color images of offensive troops previously organized by the user for use in the season including the current time may be displayed, black-and-white images of other offensive troops may be displayed. Alternatively, a predetermined label may be assigned only to images of offensive troops previously organized by the user for use in the season including the current time. Alternatively, while opaque images of offensive troops previously organized by the user for use in the season including the current time may be displayed, translucent images of other offensive troops may be displayed. Thus, the user may be prompted to choose offensive troops for the season including the current time with a higher priority. In a fourth non-limiting example, when offensive troops different from those previously organized by the user for use in the season including the current time are chosen, a message indicating reconfirmation of the choice may be provided to the user before the user determines the choice. In that case, other offensive troops may be chosen by acknowledgement of the reconfirmation.

In a fifth non-limiting example, the display form of an operation button (e.g., the option determination button Bf of FIG. 12) may be changed. For instance, when offensive troops other than those previously organized by the user for use in the season including the current time are chosen, an operation of using an operation button for determining that choice may be inactivated (that operation button is displayed in a form that does not allow that button to be chosen), or that operation button may be displayed in a form that makes it difficult to choose that button, e.g., the operation button for determining that choice is darkened, the color of the operation button is changed, or a label is assigned to the operation button.

The number of offensive troops previously set by the user for each season is at least one, e.g., six or more, or four or less. The number of defensive troops that can be previously organized and registered in the server 200 by the user for each season is at least one, e.g., two or more. The number of objects constituting a troop (an offensive troop or defensive troop) previously set by the user is at least one, e.g., five or more, or three or less, or may vary from troop to troop.

It should be noted that as shown in FIG. 11, in a battle game of this non-limiting example, a troop that is used in either of the season 1 and the season 2 can be organized. For instance, troop applications may be changed by performing an operation of changing a troop setting in a battle game to a setting in which an all-season offensive troop and an all-season defensive troop are each organized which are independent of seasons. In that case, a plurality of all-season offensive troops (e.g., five all-season offensive troops) may be previously organized instead of organizing a troop for each season. A single all-season defensive unit (a set of an all-season defensive troop, all-season defensive equipment, and an all-season defense game map) (e.g., a single defensive unit for all seasons) may be previously organized and registered in the server 200 instead of organizing a unit for each season as described above. It should be noted that in this non-limiting example, an all-season offensive troop is used as a non-limiting example of a third group.

For instance, when a battle game is performed in the season 1, a set of defensive units registered for the season 1 or defensive units registered for all seasons of another user's defensive units registered in the server 200 are presented to the user of the information processing apparatus 3 who participates, on offense, in a battle game. The information processing apparatus 3 also presents a plurality of all-season offensive troops (e.g., five all-season offensive troops) previously organized and set by the user of the information processing apparatus 3, and thereby prompts the user to choose one that is to participate in a battle game from the plurality of all-season offensive troops. When an all-season offensive troop is chosen, the information processing apparatus 3 starts a battle game between the all-season offensive troop and a defensive unit for the season 1 or all seasons presented by the server 200.

For instance, when a battle game is performed during the season 2, a set of defensive units registered for the season 2 or defensive units registered for all seasons of another user's defensive units registered in the server 200 are presented to the user of the information processing apparatus 3 who participates, on offense, in a battle game. The information processing apparatus 3 also presents a plurality of all-season offensive troops (e.g., five all-season offensive troops) previously organized and set by the user of the information processing apparatus 3, and thereby prompts the user to choose one that is to participate in a battle game from the plurality of all-season offensive troops. When an all-season offensive troop is chosen, the information processing apparatus 3 starts a battle game between the all-season offensive troop and a defensive unit for the season 2 or all seasons presented by the server 200.

Thus, in a battle game of this non-limiting example, offensive troops previously organized for each season are presented as options, depending on a season in which a battle game is performed. Therefore, the convenience of choosing an offensive troop for use in a battle game for each season is improved. In addition, in a battle game of this non-limiting example, a defensive troop corresponding to a season in which a battle game is performed is automatically chosen from defensive troops previously organized for each season and registered in the server 200, depending on a season in which a battle game is performed. Therefore, the convenience of preparing a defensive troop for use in a battle game for each season is improved. If defensive troops are not automatically changed each time seasons are changed, defense is continued in a battle game in a state disadvantageous to the user, on defense, and therefore, this is inconvenient for the user. However, such a problem can be solved by automatically changing defensive troops from season to season. In addition, in the case where the total number of player objects possessed by the user or the number of player objects suitable for a season is small, an all-season troop may be organized without organizing a troop for each season separately, and therefore, a troop may be organized, depending on the user's skill level.

When the user performs a battle game with another user as a battle opponent, a rate parameter of the user is changed. The rate parameter is used to determine a user ranking for each user who can participate in the battle game, and is also used to estimate the proficiency, experience point, game level, etc., of each user in the battle game. A non-limiting example will now be described in which the rate parameter is changed in a battle game in which four player objects are organized as each of an offensive troop and a defensive troop.

For instance, as shown in FIG. 13, when the user, on offense, fights against a battle opponent and wins the battle game with all (e.g., four) objects (i.e., own offensive player objects AOb) of an offensive troop of the user remaining on the game field, the rate parameter of the user, who is on offense and is a winner, is increased by maximum increase points (maximum acquired rate parameter: e.g., +80 points) set depending on an object belonging to the offensive troop. When the user, on offense, fights against a battle opponent and wins the battle game with one of the user's own offensive player objects AOb disappearing from the game field (e.g., three objects remaining), the rate parameter of the user, who is on offense and is a winner, is increased by 60 points. When the user, on offense, fights against a battle opponent and wins the battle game with two of the user's own offensive player objects AOb disappearing from the game field (e.g., two objects remaining), the rate parameter of the user, who is on offense and is a winner, is increased by 40 points. When the user, on offense, fights against a battle opponent and wins the battle game with three of the user's own offensive player objects AOb disappearing from the game field (e.g., one object remaining), the rate parameter of the user, who is on offense and is a winner, is increased by 20 points. Meanwhile, when the user, on offense, fights against a battle opponent and loses the battle game with all of the user's own offensive player objects AOb disappearing from the game field, the rate parameter of the user, who is on offense and is a loser, is not changed. When the user, on offense, fights against a battle opponent, then if at least one opponent defensive player object EOd remains at the time that the predetermined number of turns is reached, the user, on offense, loses, and the rate parameter of the user, on offense, is not changed. Thus, when the user, on offense, fights against a battle opponent, the rate parameter possessed by the user is increased only if the user wins the battle, and the larger the number of own offensive player objects AOb remaining is, the more the rate parameter is increased. In addition, the maximum acquired rate parameter obtained by the user, on offense, varies depending on an object belonging to an offensive troop or a season in which a battle game is performed, and therefore, it is advantageous to the user to organize objects having a large rate parameter obtained, depending on a season in which a battle game is performed, for the season.

For instance, as shown in FIG. 14, when the user, on defense, is matched up with a battle opponent in a battle game and is attacked by the battle opponent, then if the user loses the battle game with all (e.g., four) objects (i.e., opponent offensive player objects EOb) of an offensive troop of the battle opponent remaining on the game field, the rate parameter of the user, who is on defense and is a loser, is decreased by maximum decrease points set depending on an object belonging to a defensive troop (defense lost rate parameter: e.g., −80 points). When the user, on defense, is matched up with a battle opponent in a battle game and is attacked by the battle opponent, then if the user loses the battle game with one of the opponent offensive player objects EOb of the battle opponent disappearing from the game field (i.e., three objects remaining), the rate parameter of the user, who is on defense and is a loser, is decreased by 60 points. When the user, on defense, is matched up with a battle opponent in a battle game and is attacked by the battle opponent, then if the user loses the battle game with two of the opponent offensive player objects EOb of the battle opponent disappearing from the game field (i.e., two objects remaining), the rate parameter of the user, who is on defense and is a loser, is decreased by 40 points. When the user, on defense, is matched up with a battle opponent in a battle game and is attacked by the battle opponent, then if the user loses the battle game with three of the opponent offensive player objects EOb of the battle opponent disappearing from the game field (i.e., one object remaining), the rate parameter of the user, who is on defense and is a loser, is decreased by 20 points. Meanwhile, when the user, on defense, is matched up with a battle opponent in a battle game and is attacked by the battle opponent, then if the user wins the battle game with all of the opponent offensive player objects EOb of the battle opponent disappearing from the game field, the rate parameter of the user, who is on defense and is a winner, is not changed. When the user, on defense, is matched up with a battle opponent in a battle game and is attacked by the battle opponent, then if at least one of the own defensive player objects DOb remains at the time that the predetermined number of turns is reached, the user, on defense, wins and the rate parameter of the user, who is on defense and is a winner, is not changed. Thus, when the user, on defense, fights against a battle opponent, then the rate parameter possessed by the user is not changed if the user wins the battle, and is decreased if the user loses the battle. The more the number of opponent offensive player objects EOb remaining at the time of loss is, the more the rate parameter is decreased. In addition, a maximum lost rate parameter that is lost by the user, on defense, varies depending on an object belonging to an offensive troop or a season in which a battle game is performed, and therefore, it is advantageous to the user to organize objects having a small rate parameter that is lost, depending on a season in which a battle game is performed, and register the objects in the server 200.

In the above battle game, the score (rate parameter) of the user, not only on offense but also on defense, is changed, depending on the result of a battle, and therefore, it may be necessary to make a game plan in terms of not only the deposition of offensive objects but also the deposition of defensive objects. In addition, in the above battle game, an asynchronous battle game is carried out in which the user, on offense, controls an offensive object according to the user's operation, and a defensive object of another user, on defense, is automatically controlled by a control unit. In addition, the user's offensive object is used when the user themselves fights against another user, and the user's defensive object is used when the user themselves is matched up as another user's battle opponent, and therefore, different objects appear in different scenes. It should be noted that the increase and decrease in the rate parameter may be changed, depending on the number of times a battle is performed, taking into consideration the balance between offense and defense. For instance, in the case of the non-limiting example increase and decrease in the rate parameter of FIGS. 13 and 14, when the user is on defense, the rate parameter of the user themselves is only decreased. Therefore, for instance, in order to reduce the decrease of the rate parameter, the rate parameter of the user, on defense, may be changed only within a predetermined number of times a battle is performed (e.g., once) after registration of a defense map, and may not be changed in the following battles using the defense map. In another non-limiting example, when the user, on defense, wins, the rate parameter of the user may be increased, and when the user, on offense, loses, the rate parameter of the user may be decreased.

It should be noted that when the user of the information processing apparatus 3 chooses "fight against another user" in the menu of the above battle game and is matched up with a battle opponent, then if the user desires to avoid a battle against that battle opponent, the user is allowed to give up the battle. In this case, the user does not play the battle game, but consumes a participation parameter (e.g., an energy parameter) for the battle, and loses the battle game (i.e., without a change in the rate parameter).

In the above map editing, a defensive object (an own defensive equipment object DOa and an own defensive player object DOb) which is organized in the defense map area DAp by the user, and an offensive object (own offensive equipment object AOa) which is organized in the offense map area AAp (and the neutral map area NAp) by the user, may be disposed on different game maps. In FIG. 5, a defensive object and an offensive object displayed during map editing are disposed in the defense map area DAp and the offense map area AAp set on the same game map. Alternatively, for instance, the defense map area DAp and the offense map area AAp may be disposed on different game maps (e.g., the game map of FIG. 5 may be divided at the portion of the seventh row (row 7r) in the grid-pattern area). In that case, a defense game map and an offense game map that are separate game maps may be combined to form a single battle game map.

The game map used by the user in a battle against another user may be provided in any other suitable forms. For instance, an offensive object may be disposed on a game map on which a defensive object has been disposed (an offensive object is disposed and added to a combination of a defensive object and a game map). Alternatively, a defensive object may be disposed on a game map on which an offensive object has been disposed (a defensive object is disposed and added to a combination of an offensive object and a game map). Alternatively, a defensive object and an offensive object may be disposed in a game field in which none of a defensive object and an offensive object has been disposed (an offensive object and a defensive object are additionally disposed in a game field).

In the foregoing, a non-limiting example has been described in which a battle game is performed using a two-dimensional game map having a plurality of areas that are arranged in a grid-pattern and in which an object possessed by the user can be disposed. Alternatively, a two-dimensional game field that has a varying height or level, e.g., undulates, may be used, or a three-dimensional game field which allows an object to be disposed in space may be used. As used herein, the game field encompasses the above two-dimensional and three-dimensional game maps.

In addition, concerning seasons that are set, two seasons are alternately interchanged, or three or more seasons may be sequentially interchanged in predetermined order. In the case where three or more seasons are set, the number of types of attributes (attributes that may enhance an ability in the seasons) related to the seasons may be increased, or a season having a combination of an attribute that enhances an ability, on offense, and an attribute that enhances an ability, on defense, in a season, that is different from that of another season, may be set. In addition, a season and the following season may be continuous without overlapping, or a period of time that does not belong to any season may be provided between seasons. In addition, a combination of an attribute of an offensive troop and an attribute of a defensive troop that may enhance an ability in a certain season may be fixed, or may be changed from season to season. In addition, an attribute of an offensive troop and an attribute of a defensive troop that may enhance an ability in a certain season may be the same attribute.

In addition, attributes of a giver object and a recipient object may be initially set at the time of acquisition, or may be set/changed according to the user's operation. In addition, a giver object may be configured to be able to make a mission as a recipient object.

In addition, in the foregoing non-limiting example, a giver object gives an ability to a recipient object, depending on a season in which a battle game is performed, whereby an ability of a troop as a whole is improved. Alternatively, if an object corresponding to an attribute enhanced in a season belongs to a troop, an ability of the object may be simply increased irrespective of a giver object.

In addition, in the foregoing non-limiting example, in the case where an attribute to which a giver object belongs is associated with an attribute indicated by a gift item possessed by a recipient object, and the attribute is a target in a season in which a battle game is performed, then if an ability value of the recipient object is increased, a setting in the game in which the recipient object makes a mission is changed such that an advantage is given to the user. Also, a setting may be changed in other fashions. As a first non-limiting example, in the case where an attribute of a giver object is associated with an attribute indicated by a gift item possessed by a recipient object, and the attribute is a target in a season in which a battle game is performed, then if an ability value of the recipient object is decreased, a setting in the game in which the recipient object makes a mission may be changed such that a disadvantage is given to the user. As a second non-limiting example, in the case where an attribute of a giver object corresponds to an attribute indicated by a gift item possessed by a recipient object, and the attribute is a target in a season in which a battle game is performed, then if a portion of the ability values of the recipient object is increased while another portion of the ability values of the recipient object is decreased, a parameter may be changed to change a setting in the game in which the recipient object makes a mission such that an advantage is given to the user while another parameter may be changed to change a setting in that game such that a disadvantage is given to the user. As a third non-limiting example, in the case where an attribute of a giver object is associated with an attribute indicated by a gift item possessed by a recipient object, and the attribute is a target in a season in which a battle game is performed, then if an ability value of the recipient object may be changed, and in addition, an ability value of the giver object may be changed. In that case, for an ability value of the giver object, at least a portion of the parameters may be increased, at least a portion of the parameters may be decreased, or a portion of the parameters may be increased while another portion of the parameters may be decreased.

In addition, in the foregoing non-limiting example, one chosen from the four items "offensive power", "defensive strength", "speed", and "magic defensive strength" is set as an ability increase item of a recipient object that increases specifically to an attribute of a giver object. Alternatively, two or more ability increase items of a recipient object may increase. An attribute of a giver object and an ability increase item of a recipient object that increases specifically to the attribute may be previously fixed. Although, in the foregoing, there is a common ability (i.e., HP) of a recipient object that increases non-specifically to an attribute of a giver object, such a common ability of a recipient object may not be set.

In addition, although an attribute indicating a nature, characteristic, etc., that is possessed by a giver object or a recipient object is used to increase an ability, a category that may include a type, class, genre, etc., of a giver object may be used to increase an ability.

In addition, in the foregoing non-limiting example, a setting in a game is changed such that an advantage and/or a disadvantage are given to a user, by causing a giver object to increase/decrease an ability of a recipient object. Alternatively, a setting in a game is changed such that an advantage and/or a disadvantage are given to a user, by changing another setting without changing an ability value of the recipient object: such as increasing damage to an opposing object during an attack (e.g., due to acquisition of an effective technique or weapon or a bonus point, etc.) or decreasing it (e.g., due to loss of an effective technique or weapon or a bonus point, etc.); increasing or decreasing a recovery time or recovery amount with respect to a reduction in HP or extraordinary state of the recipient object; increasing or decreasing the agility of an opposing object; increasing or decreasing an experience value or skill point that is acquired by the recipient object in a fight; increasing or decreasing a play time for which the recipient object can be used; increasing or decreasing the stamina consumption of the recipient object; increasing or decreasing a reward that is acquired by the recipient object; changing an environment to one that is favorable or unfavorable to the recipient object; employing a map that is favorable or unfavorable to the recipient object; selecting a route that is advantageous or disadvantageous to the recipient object; changing the frequency of appearance of an opposing object that the recipient object is more likely to defeat or is less likely to defeat; changing the degree of difficulty in succeeding or winning; changing the order in which the recipient object attacks; or changing the recipient object to a stronger or weaker object.

In addition, when an appearance group including a plurality of giver objects belonging to the same attribute and a recipient object having a gift item indicating that attribute makes a mission, the giver objects may give a combination of effects to the recipient object, or only one of the giver objects may give an effect to the recipient object. In the former case, if different ability increase items are set in the different giver objects, the ability value of each ability increase item of the recipient object increases. If the same ability increase item is set in the different giver objects, the increase amounts of the ability value of that ability increase item of the recipient object are added up. When an appearance group including a giver object and a plurality of recipient objects having a gift item indicating the same attribute of the giver object, the giver object may give an effect to all the recipient objects or only one of the recipient objects. A giver object may belong to a plurality of attributes.

Next, main data used in the process performed in the information processing apparatus 3 will be described in FIG. 15. It should be noted that FIG. 15 is a diagram showing a non-limiting example of main data and a program stored in the storage unit 32 of the information processing apparatus 3.

Figure 15:
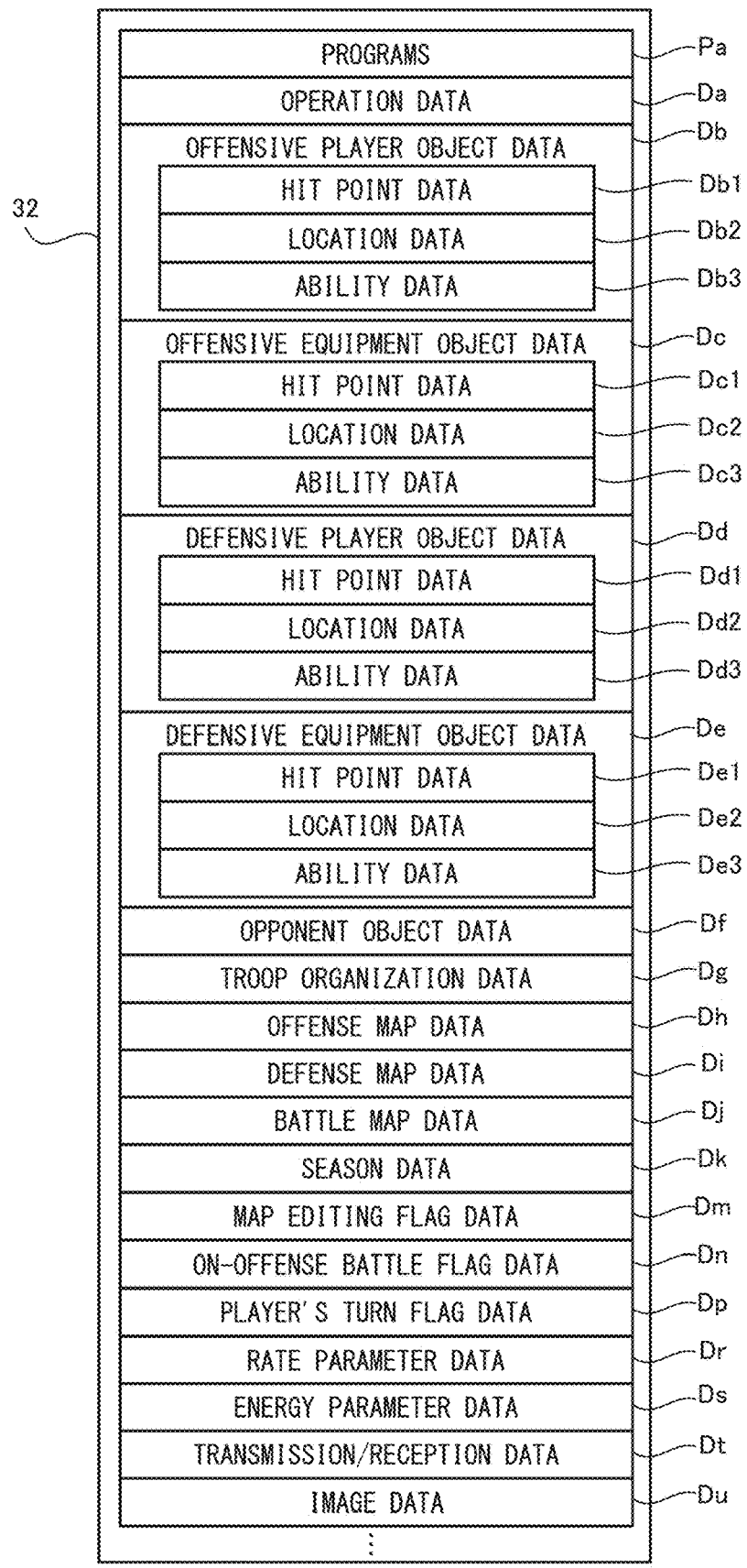
FIG. 15 is a diagram showing a non-limiting example of main data and a program stored in a storage unit 32 of the information processing apparatus 3.

As shown in FIG. 15, the storage unit 32 stores, in a data storage area, operation data Da, offensive player object data Db, offensive equipment object data Dc, defensive player object data Dd, defensive equipment object data De, opponent object data Df, troop organization data Dg, offense map data Dh, defense map data Di, battle map data Dj, season data Dk, map editing flag data Dm, on-offense battle flag data Dn, player's turn flag data Dp, rate parameter data Dr, energy parameter data Ds, transmission/reception data Dt, and image data Du, etc. It should be noted that the storage unit 32 stores, in addition to data included in the information of FIG. 15, data and the like used in an application that is executed, and data required in a process. In addition, the storage unit 32 stores, in a program storage area, a program group Pa including a communication program and an information processing program (game program).

The operation data Da indicates operation information about the user's operation performed on the information processing apparatus 3. For instance, operation data indicating an operation performed on the input unit 34 is acquired at time intervals that are a unit process time (e.g., 1/60 sec) of the information processing apparatus 3, and the operation data Da is updated with the acquired operation data.

The offensive player object data Db includes data indicating a profile and ability value of each own offensive player object AOb disposed in the offense map area AAp (the neutral map area NAp) by the user, and data indicating states thereof on a game map (battle map), i.e. hit point data Db1, location data Db2, and ability data Db3, etc. The hit point data Db1 indicates the life parameter (hit point) of an own offensive player object AOb. The location data Db2 indicates a location where an own offensive player object AOb is disposed on a game map. The ability data Db3 indicates ability values of an own offensive player object AOb including the maximum movement distance, maximum attack distance, offensive power, defensive strength, speed, and magic offensive power, etc.

The offensive equipment object data Dc includes data indicating a profile and ability value of each own offensive equipment object AOa disposed in the offense map area AAp by the user, and data indicating states thereof on a game map (battle map), i.e. hit point data Dc1, location data Dc2, and ability data Dc3, etc. The hit point data Dc1 indicates a withstanding parameter (hit point) possessed by an own offensive equipment object AOa. It should be noted that for some equipment objects such as a trap object that cause damage to another object that is invading or intruding, and then disappear, the hit point data Dc1 may not be set. The location data Dc2 indicates a location where an own offensive equipment object AOa is disposed on a game map. The ability data Dc3 indicates ability values possessed by an own offensive equipment object AOa including the ability, maximum attack distance, effect range, offensive power, offensive power, etc.

The defensive player object data Dd includes data indicating a profile and ability value of each own defensive player object DOb disposed in the defense map area DAp for each season by the user, and data indicating states thereof on a game map (battle map), i.e. hit point data Dd1, location data Dd2, and ability data Dd3, etc. The hit point data Dd1 indicates a life parameter (hit point) possessed by an own defensive player object DOb. The location data Dd2 indicates a location where an own defensive player object DOb is disposed on a game map. The ability data Dd3 indicates ability values possessed by an own defensive player object DOb including the maximum movement distance, maximum attack distance, offensive power, defensive strength, speed, and magic offensive power, etc.

The defensive equipment object data De includes data indicating a profile and ability value of each own defensive equipment object DOa disposed in the defense map area DAp for each season by the user, and data indicating states thereof on a game map (battle map), i.e. hit point data De1, location data De2, and ability data De3, etc. The hit point data De1 indicates a withstanding parameter (hit point) possessed by an own defensive equipment object DOa. It should be noted that for some equipment objects such as a trap object that cause damage to another object that is invading or intruding, and then disappear, the hit point data De1 may not be set. The location data De2 indicates a location where an own defensive equipment object DOa is disposed on a game map. The ability data De3 indicates ability values possessed by an own defensive equipment object DOa including the ability, maximum attack distance, effect range, offensive power, offensive power, etc.

The opponent object data Df indicates a profile and ability value of each opponent defensive equipment object EOc and each opponent defensive player object EOd disposed in the defense map area DAe by another user as a battle opponent, and a profile and ability value of each opponent offensive equipment object EOa and each opponent offensive player object EOb disposed in the offense map area AAe by another user as a battle opponent, and data indicating states thereof on a game map (battle map). The opponent object data Df includes hit point data, location data, and ability data, etc., of each object as a battle opponent.

The troop organization data Dg indicates configurations of an offensive troop and a defensive troop organized by the user for each season. In a non-limiting example, the troop organization data Dg indicates configurations of five offensive troops for the season 1, five offensive troops for the season 2, one defensive troop for the season 1, and one defensive troop for the season 2. In another non-limiting example, the troop organization data Dg indicates configurations of five all-season offensive troops and one all-season defensive troop.

The offense map data Dh indicates the offense map area AAp produced by the user and the offense map area AAe produced by another user as a battle opponent. The defense map data Di indicates the defense map area DAp for each season produced by the user and the defense map area DAe produced by another user as a battle opponent. The battle map data Dj indicates game maps (battle maps) used in a battle against another user.

The season data Dk indicates the type (attribute to be enhanced) of a season set at the current time.

The map editing flag data Dm indicates a map editing flag that is set "on" when the user performs map editing. The on-offense battle flag data Dn indicates an on-offense battle flag that is set "on" when a game is performed in which the user, on offense, fights against another user as a battle opponent. The player's turn flag data Dp indicates a player's turn flag that is set "on" when the user is in the player's turn in a battle game against another user.

The rate parameter data Dr indicates a rate parameter possessed by the user. The energy parameter data Ds indicates an energy parameter (participation parameter) possessed by the user.

The transmission/reception data Dt includes data that is received from another apparatus (e.g., the server 200) or data that is transmitted to another apparatus.

The image data Du is for displaying an image on a display screen in a game.

Figure 16:
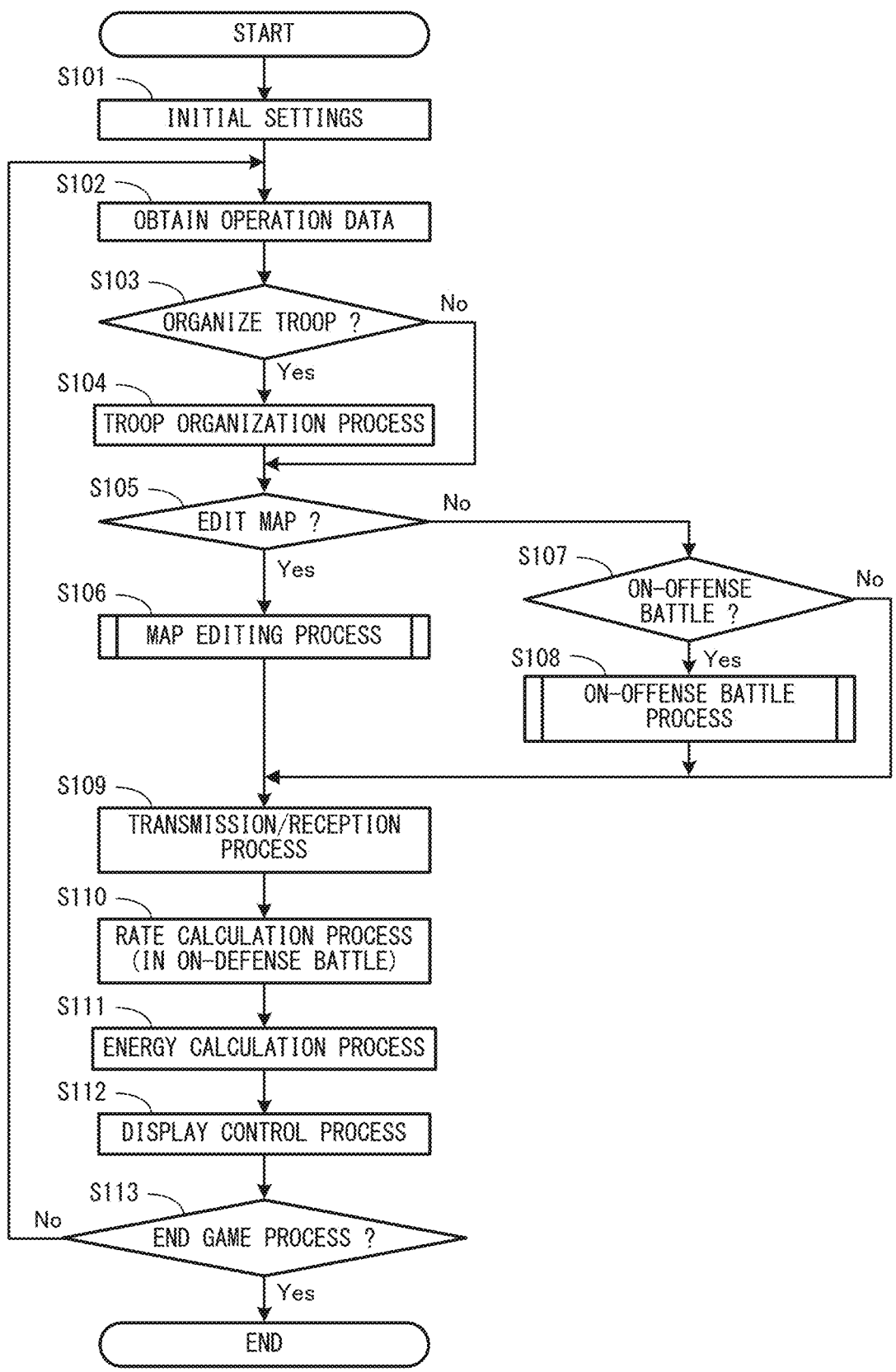
FIG. 16 is a flowchart showing a non-limiting example of a process executed in the information processing apparatus 3.
Figure 17:
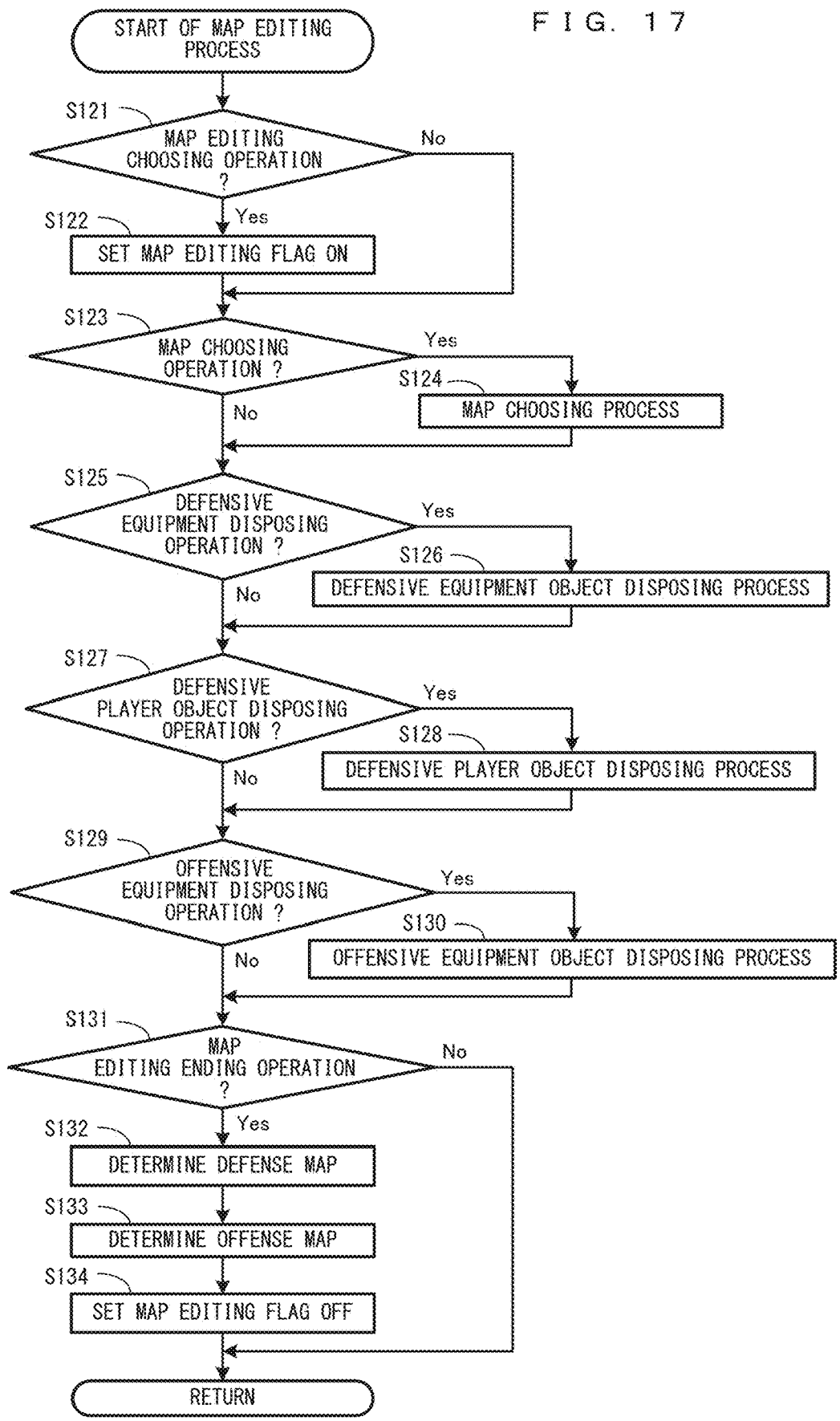
FIG. 17 is a subroutine indicating a non-limiting example of details of a map editing process in step S106 shown in FIG. 16.
Figure 18:
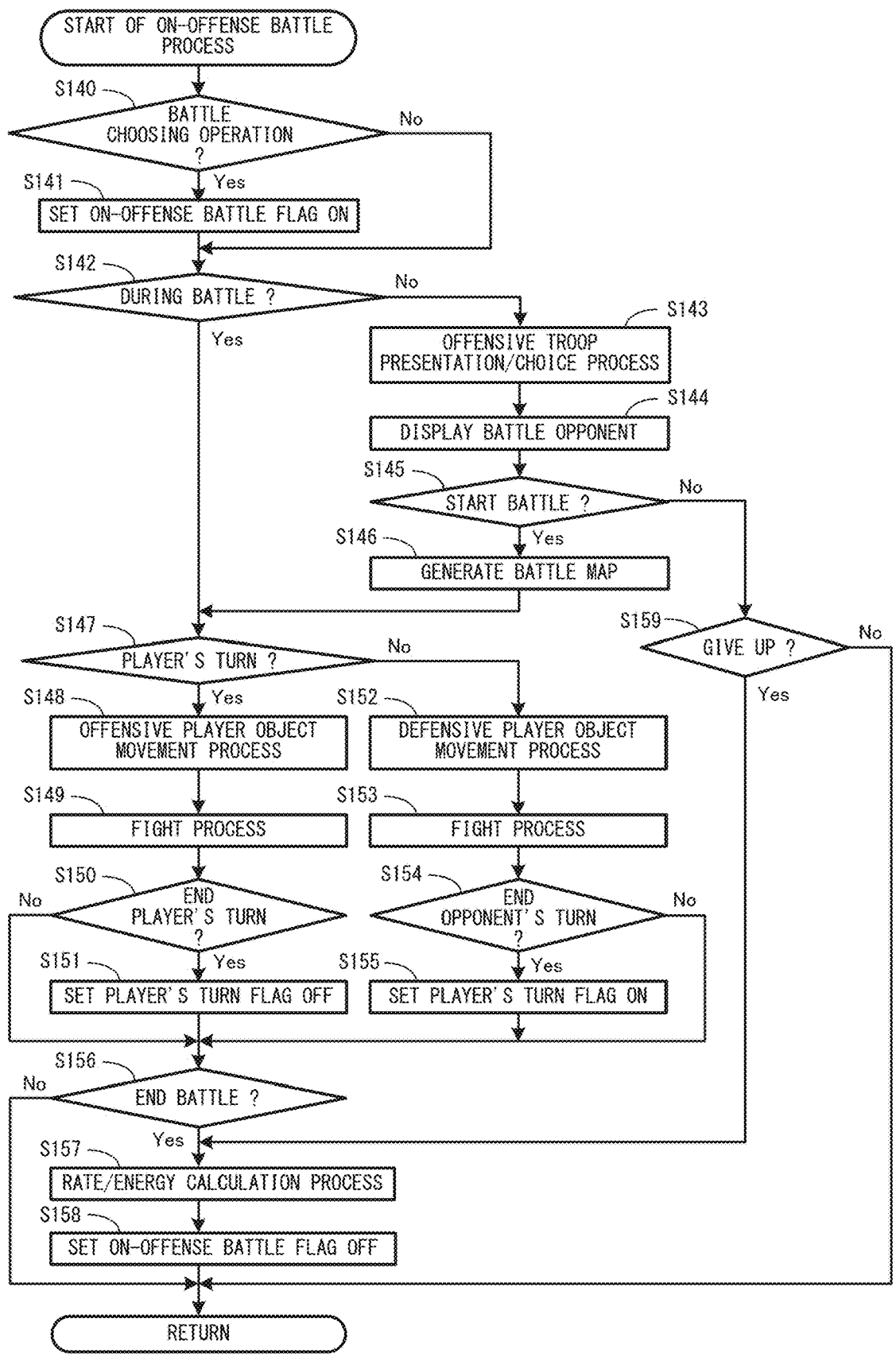
FIG. 18 is a subroutine showing a non-limiting example of details of an on-offense battle process in step S108 shown in FIG. 16.

Next, a process performed in the information processing apparatus 3 will be described in detail with reference to FIGS. 16-18. It should be noted that FIG. 16 is a flowchart showing a non-limiting example of the process executed in the information processing apparatus 3. FIG. 17 is a subroutine indicating a non-limiting example of details of a map editing process in step S106 shown in FIG. 16. FIG. 18 is a subroutine showing a non-limiting example of details of an on-offense battle process in step S108 shown in FIG. 16. Here, in the flowcharts of FIGS. 16-18, of the processes performed in the information processing system 1, game processes performed in the information processing apparatus 3 will be mainly described, and other processes that are not directly related to the game processes will not be described. In FIGS. 16-18, each step executed by the control unit 31 is abbreviated to "S".

In this non-limiting example, the series of processes of FIGS. 16-18 is performed by the control unit 31 (CPU) executing a game program stored in the program storage unit 33. It should be noted that the processes of FIGS. 16-18 are started with any suitable timing. In this case, all or a portion of the game program is loaded into the storage unit 32 with appropriate timing and is executed by the control unit 31. As a result, the series of processes of FIGS. 16-18 is started. It should be noted that it is assumed that the game program is previously stored in the program storage unit 33. It should be noted that in another non-limiting example, the game program may be obtained from a storage medium removably attached to the information processing apparatus 3 and stored into the storage unit 32, or may be obtained from another apparatus through a network, such as the Internet, and stored into the storage unit 32.

The steps of the flowcharts of FIGS. 16-18 are merely illustrative, and if a similar result is obtained, the order in which the steps are performed may be changed, and another step may be executed in addition to and/or instead of each step. Although in this non-limiting example embodiment, it is assumed that each step of the flowcharts is executed by the control unit 31, all or a portion of the steps of the flowcharts may be executed by a processor other than the CPU of the control unit 31 or a dedicated circuit.

In FIG. 16, the control unit 31 sets initial settings (step S101), and control proceeds to the next step. For instance, the control unit 31 initially sets parameters for use in the subsequent steps. In a non-limiting example, the season control unit 31 sets a season in which a battle game is performed, depending on the date of the current time, and updates the season data Dk.

Next, the control unit 31 acquires operation data from the input unit 34 and updates the operation data Da (step S102), and control proceeds to the next step.

Next, the control unit 31 determines whether or not to organize a troop (step S103). For instance, if the control unit 31 determines based on the operation data Da that an operation of choosing "organize a troop" from the game menu has been performed, or that the troop organization process is being performed, the result of the determination in step S103 is positive. If the control unit 31 determines to organize a troop, control proceeds to step S104. Otherwise, i.e., if the control unit 31 determines not to organize a troop, control proceeds to step S105.

In step S104, the control unit 31 performs the troop organization process, and control proceeds to step S105. For instance, the control unit 31 forms a troop organization screen that displays a troop organization area and a possessed object area as shown in FIGS. 9 and 10, depending on a troop that is to be organized, and based on the object data Da, generates an image in which images of objects possessed at the current time are arranged in the possessed object area, and displays the game image in a display control process of step S112 described below. Here, a troop to be organized is chosen according to the user's operation. In a non-limiting example, one chosen from five offensive troops for the season 1, five offensive troops for the season 2, one defensive troop for the season 1, and one defensive troop for the season 2 is a troop to be organized. In another non-limiting example, one chosen from five all-season offensive troops and one all-season defensive troop is a troop to be organized. In addition, the control unit 31 chooses an object for which the user's operation of putting the object into the troop has been performed, by referring to the operation data Dd, generates an image in which an image of that object is arranged in the troop organization area, and displays the game image in a display control process of step S115 described below. In addition, the control unit 31 calculates a maximum acquired rate parameter or a maximum lost rate parameter, depending on a season in which the troop is to be used, generates an image indicating the rate information R indicating the rate parameter, and displays the game image in the display control process of step S115 described below. In addition, the control unit 31 puts the object for which the user's operation of putting the object into the troop has been performed, into the troop being currently organized, and updates the troop organization data Dg corresponding to the troop. Thereafter, if the control unit 31 determines based on the operation data Dd that an operation of ending the troop organization process has been performed, the control unit 31 performs a process of ending the troop organization process.

In step S104, if an object displayed in the troop organization area and/or the possessed object area is a giver object or recipient object, the control unit 31 may display an image that allows the user to identify the attribute. In a non-limiting example, the control unit 31 may display an attribute of an object by displaying and assigning the label G or I indicating an attribute to which the object belongs, to an image of the object, as shown in FIGS. 9 and 10.

In step S105, the control unit 31 determines whether or not to perform map editing. For instance, when the control unit 31 determines, with reference to the operation data Da, that an operation of choosing "map editing" in a game menu has been performed, or that the map editing flag indicated by the map editing flag data Dm is "on", the result of the determination by the control unit 31 in step S105 is positive. When the control unit 31 determines to perform map editing, control proceeds to step S106. Otherwise, i.e. when the control unit 31 determines not to perform map editing, control proceeds to step S107.

In step S106, the control unit 31 performs a map editing process, and control proceeds to step S109. A non-limiting example of the map editing process performed in step S106 will now be described with reference to FIG. 17.

In FIG. 17, the control unit 31 determines whether or not an operation of choosing "map editing" has currently been performed (step S121). For instance, if the operation data Da indicates an operation of choosing "map editing" in the game menu, the result of the determination by the control unit 31 in step S121 is positive. When the control unit 31 determines that an operation of choosing "map editing" has currently been performed, control proceeds to step S122. Otherwise, i.e. when the control unit 31 determines that an operation of choosing "map editing" has not currently been performed, control proceeds to step S123.

In step S122, the control unit 31 sets the map editing flag "on" and updates the map editing flag data Dm, and control proceeds to step S123.

In step S123, the control unit 31 determines whether or not an operation of choosing one from a plurality of game maps has been performed. For instance, when the operation data Da indicates an operation of choosing a game map, the result of the determination by the control unit 31 in step S123 is positive. When the control unit 31 determines that an operation of choosing a game map has been performed, control proceeds to step S124. Otherwise, i.e. when the control unit 31 determines that an operation of choosing a game map has not been performed, control proceeds to step S125.

In step S124, the control unit 31 performs a process of choosing a game map for a season in which editing is being currently performed, according to the user's operation, and control proceeds to step S125. For instance, the control unit 31 performs a process of choosing a game map for use in a battle that is for a season in which editing is being currently performed, from a plurality of kinds of previously prepared terrains, according to the operation data Da. Thereafter, the control unit 31 updates an offense map in the offense map data Dh with a portion of the chosen game map corresponding to the offense map area AAp (and the neutral map area NAp). The control unit 31 also updates a defense map for the season in which editing is being currently performed, in the defense map data Di, using a portion of the chosen game map corresponding to the offense map area AAp.

In step S125, the control unit 31 determines whether or not an operation of disposing a defensive equipment object has been performed. For instance, if the operation data Da indicates an operation of disposing a defensive equipment object, the result of the determination by the control unit 31 in step S125 is positive. When the control unit 31 determines that an operation of disposing a defensive equipment object has been performed, control proceeds to step S126. Otherwise, i.e. when the control unit 31 determines that an operation of disposing a defensive equipment object has not been performed, control proceeds to step S127.

In step S126, the control unit 31 performs a process of disposing a defensive equipment object in a defense map area according to the user's operation, and control proceeds to step S127. For instance, the control unit 31 performs a process of disposing, as an own defensive equipment object DOa, an equipment object that has been chosen by the user as an object to be disposed, in the defense map area DAp for the season in which editing is being currently performed in the defense map data Di, according to the user's operation, with reference to the operation data Da and the defense map data Di (see FIG. 5). Thereafter, the control unit 31 updates the defensive equipment object for the season in which editing is being currently performed in the defensive equipment object data De, based on the type and location of the own defensive equipment object DOa disposed in the defense map area DAp.

In step S127, the control unit 31 determines whether or not an operation of disposing a defensive player object has been performed. For instance, if the operation data Da indicates an operation of disposing a defensive player object, the result of the determination by the control unit 31 in step S127 is positive. When the control unit 31 determines that an operation of disposing a defensive player object has been performed, control proceeds to step S128. Otherwise, i.e. when the control unit 31 determines that an operation of disposing a defensive player object has not been performed, control proceeds to step S129.

In step S128, the control unit 31 performs a process of disposing a defensive player object in a defense map area according to the user's operation, and control proceeds to step S129. For instance, the control unit 31 performs a process of disposing, as an own defensive player object DOb, a player object chosen by the user as an object to be disposed, in the defense map area DAp for the season in which editing is being currently performed in the defense map data Di, according to the user's operation, with reference to the operation data Da and the defense map data Di (see FIG. 5). Thereafter, the control unit 31 updates the defensive player object for the season in which editing is being currently performed in the defensive player object data Dd, based on the type and location of the own defensive player object DOb disposed in the defense map area DAp.

In step S129, the control unit 31 determines whether or not an operation of disposing an offensive equipment object has been performed. For instance, if the operation data Da indicates an operation of disposing an offensive equipment object, the result of the determination by the control unit 31 in step S129 is positive. When the control unit 31 determines that an operation of disposing an offensive equipment object has been performed, control proceeds to step S130. Otherwise, i.e. when the control unit 31 determines that an operation of disposing an offensive equipment object has not been performed, control proceeds to step S131.

In step S130, the control unit 31 performs a process of disposing an offensive equipment object in an offense map area according to the user's operation, and control proceeds to step S131. For instance, the control unit 31 performs a process of disposing, as an own offensive equipment object AOa, an equipment object chosen by the user as an object to be disposed, in the offense map area AAp indicated by the offense map data Dh, according to the user's operation, with reference to the operation data Da and the offense map data Dh (see FIG. 5). Thereafter, the control unit 31 updates the offensive equipment object data Dc, based on the type and location of the own offensive equipment object AOa disposed in the offense map area AAp.

In step S131, the control unit 31 determines, with reference to the operation data Da, whether or not an operation of ending map editing has been performed. When the control unit 31 determines that an operation of ending map editing has been performed, control proceeds to step S132. Otherwise, i.e. when the control unit 31 determines that an operation of ending map editing has not been performed, the control unit 31 ends the subroutine.

In step S132, the control unit 31 performs a process of determining a defense map for the season in which editing is being currently performed, by map editing, and control proceeds to the next step. For instance, the control unit 31 generates a defense map area DAp for the season in which editing is being currently performed, in which an own defensive equipment object DOa and an own defensive player object DOb are disposed, based on the defensive player object data Dd, the defensive equipment object data De, and the defense map data Di, and updates the defense map data Di for the season in which editing is being currently performed with the generated defense map area DAp. The control unit 31 also writes the defense map data Di for the season in which editing is being currently performed, as transmission data to be transmitted to the server 200, into the transmission/reception data Dt, in order to register the user's defense map for the season in which editing is being currently performed, which is indicated by the defense map data Di, into the server 200.

Next, the control unit 31 performs a process of determining an offense map by map editing, and control proceeds to the next step. For instance, the control unit 31 generates an offense map area AAp in which an own offensive equipment object AOa is disposed, based on the offensive equipment object data Dc and the offense map data Dh, and updates the offense map data Dh with the generated offense map area AAp.

Next, the control unit 31 sets the map editing flag "off" and updates the map editing flag data Dm, and ends the subroutine.

Referring back to FIG. 16, when in step S105 the control unit 31 determines not to perform map editing, the control unit 31 determines whether or not to perform a battle on offense (step S107). For instance, when the control unit 31 determines, with reference to the operation data Da, that an operation of choosing "fight against another user" in the game menu has been performed, or when the on-offense battle flag indicated by the on-offense battle flag data Dn is "on", the result of the determination by the control unit 31 in step S107 is positive. When the control unit 31 determines to perform a battle on offense, control proceeds to step S108. Otherwise, i.e. when the control unit 31 determines not to perform a battle on offense, control proceeds to step S109. It should be noted that if the numerical value of the energy parameter indicated by the energy parameter data Ds is smaller than the numerical value required for participation in an on-offense battle, the game menu may be displayed on the display unit 35 with the option "fight against another user" in the game menu not allowed to be chosen (e.g., that option is not displayed).

In step S108, the control unit 31 performs an on-offense battle process, and control proceeds to step S109. A non-limiting example of the on-offense battle process performed in step S108 will not be described with reference to FIG. 18.

In FIG. 18, the control unit 31 determines whether or not an operation of choosing "fight against another user" has currently been performed (step S140). For instance, if the operation data Da indicates an operation of choosing "fight against another user" in the game menu, the result of the determination by the control unit 31 in step S140 is positive. When the control unit 31 determines that an operation of choosing "fight against another user" has currently been performed, control proceeds to step S141. Otherwise, i.e. when the control unit 31 determines that an operation of choosing "fight against another user" has not currently been performed, control proceeds to step S142.

In step S141, the control unit 31 sets the on-offense battle flag "on" and updates the on-offense battle flag data Dn, and control proceeds to step S142. The control unit 31 also writes a battle request, as transmission data to be transmitted to the server 200, into the transmission/reception data Dt in order to request the server 200 to match up with a battle opponent.

In step S142, the control unit 31 determines whether or not a battle game is being played in which the user, on offense, fights against a battle opponent. When the control unit 31 determines that a battle game for fighting against a battle opponent is not being played, i.e. when a battle game for fighting against a battle opponent has not yet been started, control proceeds to step S143. Otherwise, i.e. when the control unit 31 determines that a battle game for fighting against a battle opponent is being played, control proceeds to step S147.

In step S143, the control unit 31 presents a plurality of offensive troops set for the current season, and prompts the user to choose an offensive troop that is to participate in a battle game, from the plurality of offensive troops, and control proceeds to the next step. For instance, the control unit 31 extracts, based on a season indicated by the season data Dk, a plurality of offensive troops set for the season (including all seasons) in the troop organization data Dg, and displays an image (see FIG. 12) indicating the plurality of offensive troops in the display control process of step S115 described below, to prompt the user to choose one that is to participate in a battle game from the plurality of offensive troops, and waits until the user determines an offensive troop.

Next, the control unit 31 displays a battle opponent, and prompts the user to perform an operation of starting a battle against the battle opponent (step S144), and control proceeds to the next step. For instance, the control unit 31 displays a battle opponent for the current season on the display unit 35, based on battle opponent data for the current season that is transmitted by the server 200 after performing matching-up in response to a battle request transmitted to the server 200. It should be noted that the server 200 chooses a defensive unit set for the current season (including all seasons), of another user's defensive units previously registered, in response to a battle request received from the information processing apparatus 3, and transmits data indicating the defensive unit as battle opponent data for the current season. The control unit 31 also subtracts the numerical value of the energy parameter (participation parameter) required for a battle against the battle opponent from the numerical value of the energy parameter indicated by the energy parameter data Ds, and updates the energy parameter data Ds with the numerical value of the energy parameter resulting from the subtraction. It should be noted that the numerical value that is subtracted may be calculated based on the user's assessment value (rate parameter), and for instance, may be increased with an increase in the user's assessment value. The battle opponent data transmitted by the server 200 may also include data indicating a defense map area DAe for the current season produced by another user as a battle opponent performing map editing. When the control unit 31 displays a battle opponent, the control unit 31 may display the defense map area DAe of the battle opponent on the display unit 35.

Next, the control unit 31 determines whether or not an operation of starting a battle against the displayed battle opponent has been performed (step S145). For instance, if the operation data Da indicates an operation of choosing an offensive troop that is to participate in a battle game and starting a battle, the result of the determination by the control unit 31 in step S145 is positive. When the control unit 31 determines that an operation of starting a battle has been performed, control proceeds to step S146. Otherwise, i.e. when the control unit 31 determines that an operation of starting a battle has not been performed, control proceeds to step S159.

In step S146, the control unit 31 performs a process of generating a game map for a battle, and control proceeds to step S147. For instance, the control unit 31 combines an offense map area AAp indicated by the offense map data Dh with the battle opponent's defense map area DAe indicated by the battle opponent data received from the server 200, into a single game map for a battle, and updates the battle map data Dj with the game map. The control unit 31 also disposes a player object belonging to the user's offensive troop chosen in step S145 as an own offensive player object AOb in the neutral map area NAp of the game map for a battle, and updates the offensive equipment object data Dc with the type and location of the own offensive player object AOb disposed on the game map for a battle (see FIG. 6). It should be noted that own offensive player objects AOb may be sequentially disposed on the game map for a battle according to the user's operation, or may be disposed at locations previously set by the user. In the former case, the control unit 31 may repeatedly perform step S146 until the disposition of own offensive player objects AOb on the game map for a battle has been completed.

In addition, in step S146, an ability of the player object is adjusted, depending on the current season. For instance, if in the season indicated by the season data Dk, a giver object and recipient object, on offense, belonging to an attribute that is increased are included in an offensive troop (i.e., own offensive player objects AOb) that is to participate in a battle game, the control unit 31 causes the giver object to give an ability to the recipient object and thereby improves an ability of the offensive troop as a whole, and updates the offense player object data Db (ability data). In addition, if in a season indicated by the season data Dk, a giver object and recipient object, on defense, belonging to an attribute that is increased are included in a defensive troop (i.e., opponent defensive player objects EOd) that is to be a battle opponent in a battle game, the control unit 31 causes the giver object to give an ability to the recipient object and thereby improves an ability of the defensive troop as a whole, and updates the defense player object data Dd (ability data).

In step S147, the control unit 31 determines whether or not the current turn is the player's turn in a game in which the user, on offense, fights against a battle opponent. For instance, if the player's turn flag indicated by the player's turn flag data Dp is "on", the result of the determination by the control unit 31 in step S147 is positive. When the control unit 31 determines that the current turn is the player's turn, control proceeds to step S148. Otherwise, i.e. when the control unit 31 determines that the current turn is the opponent's turn, control proceeds to step S152.

In step S148, the control unit 31 performs an offensive player object movement process, and control proceeds to the next step. For instance, the control unit 31 moves an own offensive player object AOb disposed on the game map for a battle according to the user's operation. Specifically, when the control unit 31 determines, with reference to the operation data Da, that an operation of moving one of own offensive player objects AOb as an object to be operated, on the game map for a battle, has been performed, the control unit 31 moves the location of the own offensive player object AOb according to the operation, and updates the location data Db2 of the own offensive player object AOb with the location after the movement. It should be noted that a movement amount, movement speed, and movement range of an own offensive player object AOb are controlled based on movement characteristics of the own offensive player object AOb in the ability data Db3.

Next, the control unit 31 performs a fight process between an offensive object and a defensive object (step S149), and control proceeds to the next step. For instance, when the control unit 31 determines that the user has performed an operation of attacking the battle opponent's defensive object, the control unit 31 performs a process of causing an own offensive player object AOb and the battle opponent's defensive object to fight against each other according to the operation, and updates the hit point data Db1 of the own offensive player object AOb and the hit point data of the defensive object. In the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. It should be noted that in the fight process of step S149, the ability and maximum attack distance of an own offensive player object AOb during a fight against a defensive object are set based on the ability data Db3 of the own offensive player object AOb.

In step S149, the control unit 31 may perform a fight process between an own offensive equipment object AOa and a defensive object. For instance, if the current time is a timing that an effect of an own offensive equipment object AOa occurs (e.g., at the start or end of the player's turn), the control unit 31 performs a process of causing the own offensive equipment object AOa and the battle opponent's defensive object to fight against each other, and updates the hit point data Dc1 of the own offensive equipment object AOa and the hit point data of the defensive object. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. It should be noted that in the fight process of step S149, the ability and maximum attack distance of an own offensive equipment object AOa during a fight against a defensive object are set based on the ability data Dc3 of the own offensive equipment object AOa.

Next, the control unit 31 determines whether or not the player's turn has ended (step S150). For instance, if all own offensive player objects AOb disposed on the game map for a battle have ended their actions or when the operation data Da indicates that the user has performed a predetermined operation (an operation of choosing an operation button for instructing to end the turn), the result of the determination by the control unit 31 in step S150 is positive. When the control unit 31 determines that the player's turn has ended, control proceeds to step S151. Otherwise, i.e. when the control unit 31 determines that the player's turn has not ended, control proceeds to step S156.

In step S151, the control unit 31 sets the player's turn flag "off" and updates the player's turn flag data Dp, and control proceeds to step S156.

Meanwhile, when in step S147 the control unit 31 determines that the current turn is the opponent's turn, the control unit 31 performs a defensive player object movement process (step S152), and control proceeds to the next step. For instance, the control unit 31 moves an opponent defensive player object EOd disposed on the game map for a battle according to a predetermined algorithm. Specifically, the control unit 31 moves one of opponent defensive player objects EOd as an object to be moved, on the game map for a battle, and updates the opponent object data Df (location data) of that opponent defensive player object EOd using the location after the movement. It should be noted that a movement amount, movement speed, and movement range of an opponent defensive player object EOd are controlled based on movement characteristics of the opponent defensive player object EOd in the opponent object data Df (ability data).

Next, the control unit 31 performs a fight process between the battle opponent's defensive object and the user's offensive object (step S153), and control proceeds to the next step. For instance, when an opponent defensive player object EOd attacks the user's own offensive player object AOb, the control unit 31 performs a process of causing the opponent defensive player object EOd and the own offensive player object AOb to fight against each other, and updates the hit point data of the opponent defensive player object EOd and the hit point data Db1 of the own offensive player object AOb. In the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. When an opponent defensive player object EOd attacks the user's own offensive equipment object AOa, the control unit 31 performs a process of causing the opponent defensive player object EOd to attack the own offensive equipment object AOa, and updates the hit point data Dc1 of the own offensive equipment object AOa. Also in the process of attacking the own offensive equipment object AOa, an image in which the opponent defensive player object EOd attacks the own offensive equipment object AOa is generated, and the amount of damage to the own offensive equipment object AOa is determined based on the ability of the opponent defensive player object EOd and the withstanding ability of the own offensive equipment object AOa, etc., and a hit point corresponding to the damage is subtracted to update the hit point data Dc1 of the own offensive equipment object AOa, an own offensive equipment object AOa whose resultant hit point is zero is destroyed and made ineffective on the game map for a battle. It should be noted that in the fight process of step S128, the ability and maximum attack distance of an opponent defensive player object EOd in a fight against an own offensive player object AOb and an attack on an own offensive equipment object AOa are set based on the opponent object data Df (ability data) of the opponent defensive player object EOd.

In step S153, the control unit 31 may also perform a fight process between the battle opponent's opponent defensive equipment object EOc and the user's offensive object. For instance, when the current time is a timing that an effect of an opponent defensive equipment object EOc occurs (e.g., at the start or end of the opponent's turn), a process of causing the opponent defensive equipment object EOc and the user's offensive object to fight against each other is performed, and the hit point data of the opponent defensive equipment object EOc and the hit point data Db1 or Dc1 of the offensive object are updated. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. It should be noted that in the fight process of step S153, the ability and maximum attack distance of an opponent defensive equipment object EOc in a fight against an offensive object are set based on the opponent object data Df (ability data) of the opponent defensive equipment object EOc.

Next, the control unit 31 determines whether or not the opponent's turn has ended (step S154). For instance, when all opponent defensive player objects EOd disposed on the game map for a battle has ended their actions, the result of the determination by the control unit 31 in step S154 is positive. When the control unit 31 determines that the opponent's turn has ended, control proceeds to step S155.

Otherwise, i.e. when the control unit 31 determines that the opponent's turn has not ended, control proceeds to step S156.

In step S155, the control unit 31 sets the player's turn flag "on" and updates the player's turn flag data Dp, control proceeds to step S156.

In step S156, the control unit 31 whether or not to end the game in which the user, on offense, fights against the battle opponent. A battle game is ended under, for instance, the condition that the condition for ending the battle game is satisfied (e.g., the maximum number of turns set for the battle game has been reached, all own offensive player objects AOb or all opponent defensive player objects EOd have been defeated or destroyed, etc.), the condition that the user has performed an operation of ending the battle game, etc. When the control unit 31 determines not to end the battle game, the control unit 31 ends the subroutine. When the control unit 31 determines to end the battle game, control proceeds to step S157.

In step S157, the control unit 31 performs a rate/energy calculation process, and control proceeds to the next step. For instance, the control unit 31 calculates the numerical value of the rate parameter that is added or subtracted to or from the user, depending on the number or types of offensive and/or defensive objects remaining on the game map for a battle at the end of the game, and updates the rate parameter data Dr based on the calculated numerical value. For instance, in the case where the rate increase/decrease condition illustrated in FIG. 13 is used, the user, on offense, can acquire a rate point corresponding to the number or types of own offensive player objects AOb remaining on the game map for a battle at the end of the game only if the user has won the battle game. In addition, when the battle opponent's building object which gives a bonus to the user (i.e., an opponent defensive equipment object EOc that gives a bonus) is destroyed by the user's offensive object in a battle game, the control unit 31 calculates the numerical value of an energy parameter (participation parameter) added to the user, depending on the destroyed defensive object, and updates the energy parameter data Ds with the calculated numerical value. For instance, the numerical value of an energy parameter (participation parameter) added to the user, depending on the destroyed defensive object, may be calculated based on the assessment value (rate parameter) of the user. For instance, the higher the assessment value is, the greater the added numerical value is.

Next, the control unit 31 sets the on-offense battle flag "off" and updates the on-offense battle flag data Dn (step S158), and ends the subroutine. The control unit 31 also writes the result of the battle against the battle opponent, as transmission data to be transmitted to the server 200, into the transmission/reception data Dt in order to notify the server 200 of the battle result.

When in step S145 the control unit 31 determines not to start a battle, the control unit 31 determines whether or not to give up a battle against the displayed battle opponent (step S159). For instance, if the operation data Da indicates an operation of giving up, the result of the determination by the control unit 31 in step S159 is positive. When the control unit 31 determines that an operation of giving up has been performed, control proceeds to step S157. Otherwise, i.e. when the control unit 31 determines that an operation of giving up has not been performed, the control unit 31 ends the subroutine.

Referring back to FIG. 16, in step S109, the control unit 31 performs a transmission/reception process, and control proceeds to the next step. For instance, the control unit 31 transmits transmission data written in the transmission/reception data Dt as data to be transmitted to the server 200, to the server 200 through the network 100. The control unit 31 also receives data from the server 200 through the network 100, and writes the received data into the transmission/reception data Dt.

In a first non-limiting example, if the defense map data Di has been written as transmission data in the transmission/reception data Dt in order to register the user's defense map into the server 200, the control unit 31 transmits, to the server 200, data for requesting registration of the defense map. As a result, the defense map indicated by the transmitted data is registered, into the server 200, as one of defense maps of battle opponents with which the user may be matched up in a battle game.

In a second non-limiting example, if a request for a battle has been written, as transmission data to be transmitted to the server 200, in the transmission/reception data Dt according to the user's operation of choosing "fight against another user", the control unit 31 transmits the data indicating the request for a battle to the server 200. As a result, the server 200 matches the user requesting a battle up with one of the registered battle opponents (defense map) for the current season, and transmits battle opponent data indicating the matched-up battle opponent to the information processing apparatus 3 that has transmitted the request for a battle. When the battle opponent data is transmitted from the server 200, the control unit 31 receives and writes the battle opponent data into the transmission/reception data Dt in step S109. It should be noted that the battle opponent data may include data indicating a defense map area DAe that has been produced by another user as a battle opponent matched up with the user performing map editing.

In a third non-limiting example, if a battle game between the user, on offense, and another user has been ended in step S108, and the result of the battle against the second user has been written as transmission data in the transmission/reception data Dt, the control unit 31 transmits battle result data indicating the result of the battle to the server 200. As a result, the server 200 transmits the battle result data to the information processing apparatus 3 of the second user as a battle opponent in the battle game. It should be noted that the server 200 may transfer the battle result data received from the user's information processing apparatus 3 directly to the second user's information processing apparatus 3, or may perform a predetermined process on the battle result data received from the user's information processing apparatus 3 before transmitting the resultant battle result data to the second user's information processing apparatus 3.

In a fourth non-limiting example, if a battle game between the user and another user on offense matched up by the server 200 has been performed using the user's defense map for the current season registered in the server 200, battle result data indicating the result of a battle in the battle game is transmitted from the server 200. When the battle result data is transmitted from the server 200, the control unit 31 receives and writes the battle result data into the transmission/reception data Dt in step S109. As a result, the control unit 31 is notified that another user has performed a battle game against the user, on defense, using the user's defense map registered in the server 200.

Next, the control unit 31 performs a rate calculation process based on the result of an on-defense battle (step S110), and control proceeds to the next step. For instance, when the control unit 31 has received battle result data from the server 200 in step S109, the control unit 31 calculates the numerical value of a rate parameter which is to be added or subtracted to or from the user, based on the number or types of offensive objects and/or defensive objects at the end of the battle in the result of the battle indicated by the battle result data, and updates the rate parameter data Dr with the calculated numerical value. For instance, in the case where the rate increase/decrease condition illustrated in FIG. 14 is used, when the user, on defense, loses in a battle game in which the user is matched up with another user, a point corresponding to the number or types of opponent offensive player objects EOb remaining on a game map for a battle at the end of the battle game is subtracted from the rate point of the user themselves. Also, in the case where the rate increase/decrease condition illustrated in FIG. 14 is used, even when the user, on defense, wins a battle against another user on offense, the user cannot acquire a rate point. It should be noted that in the case where a battle game is performed in which the user, on defense, is matched up with another user, the second user's energy parameter (participation parameter) is increased or decreased, and the energy parameter (participation parameter) of the user, on defense, is not increased or decreased.

Next, the control unit 31 performs an energy calculation process based on elapsed time (step S111), and control proceeds to the next step. For instance, the control unit 31 adds a predetermined value to the rate parameter indicated by the rate parameter data Dr, based on elapsed time, and updates the rate parameter data Dr with the rate parameter after the addition.

Next, the control unit 31 generates a display image and performs a display control process of displaying the display image on the display unit 35 (step S112), and control proceeds to the next step. For instance, the control unit 31 generates a display image corresponding to the result of each step (e.g., game map images and troop choice images during map editing and a battle), and performs a process of displaying the display image on the display unit 35.

Next, the control unit 31 determines whether or not to end the game process (step S113). The game process is ended under, for instance, the condition that the condition for ending the game process is satisfied, the condition that the user has performed an operation of ending the game process, etc. When the control unit 31 determines not to end the game process, control returns to step S102, in which the control unit 31 repeats the process. When the control unit 31 determines to end the game process, the control unit 31 ends the process of the flowchart.

Thus, in the battle game by the game process, an offensive troop previously organized for each season is presented, with a higher priority, as an option that is to participate in the battle game, depending on a season in which the battle game is performed, and therefore, the convenience of choosing an offensive troop for use in a battle game for each season is improved. In addition, in the battle game, a defensive troop corresponding to a season in which the battle game is performed is automatically chosen from defensive troops previously organized for seasons and registered in the server 200, and therefore, the convenience of preparing a defensive troop for use in a battle game for each season is improved.

It should be noted that in the above non-limiting examples, when the user, on offense, participates in a battle game, offensive troops previously organized for a season in which the battle game is performed are presented as options for an offensive troop that is to participate in the battle game. Alternatively, options may be presented in other group forms. In a non-limiting example, sets of offensive troops previously organized for a season in which a battle game is performed, and offense equipment (own offensive equipment object), may be presented as options. In another non-limiting example, sets of offensive troops previously organized for a season in which a battle game is performed, and offense equipment (own offensive equipment object) including a location where the offense equipment is disposed on a map, may be presented as options.

In the above non-limiting example game process, offensive troops previously organized for a season in which a battle game is performed are presented as options for an offensive troop that is to participate in the battle game, then an offensive troop that is to participate in the battle game is determined, and then the battle game is started. These process steps may be performed in different orders. For instance, after the start of a battle game using another user's defensive unit is determined, offensive troops previously organized for a season in which the battle game is be performed may be presented as options for an offensive troop that is to participate in the battle game, and an offensive troop that is to participate in the battle game may be determined.

In the above battle game between a plurality of users, a user on offense controls an offensive object according to the user's operation, and a user on defense controls a defensive object according to automatic control by a control unit. Alternatively, in a battle game, a user on offense may control an offensive object according to automatic control by a control unit, and a user on defense may control a defensive object according to the user's operation. Alternatively, in a battle game, both a user on offense and a user on defense may control an offensive object and a defensive object, respectively, according to the users' operations. Alternatively, in a battle game, both an offensive object and a defensive object may each be controlled according to automatic control by a control unit.

In the above non-limiting examples, a game field for a battle is formed by combining an offense map and defense map that have a grid-pattern area, and a battle game is performed using the game field. This non-limiting example may be applicable to any game in addition to the battle game. For instance, this non-limiting example is applicable to a game in which objects possessed by the user simply fight against each other without offense and defense turns, and a battle game in which a map is not yet set before organization of a troop (i.e., a troop(s) is only configured during organization), and an arbitrary game field is chosen during the start of a battle.

In the foregoing, a non-limiting example has been described in which an asynchronous battle process between two users is performed in the information processing apparatus 3 of one of the two users. Alternatively, these processes may be performed in another apparatus coupled to the information processing apparatus 3 of one of the two users or another apparatus that can communicate with the information processing apparatus 3 of one of the two users. For instance, an asynchronous battle process between two users may be performed in the server 200, and the results of the processes may be sequentially transmitted to the information processing apparatus 3 of one of the two users.

In the foregoing, data is exchanged between information processing apparatuses 3 through the server 200. As a result, communication between information processing apparatuses 3 is centrally controlled by the server 200, and therefore, the matching up of a battle opponent and the communication control are easily performed. However, in the case where data may not be centrally held in the server 200, data may be exchanged between information processing apparatuses 3 or with other apparatuses without through the server 200.

In the foregoing non-limiting example, an information process is performed by the information processing apparatus 3. Alternatively, at least a portion of the above steps in the processes may be performed by another apparatus. For instance, steps in the processes may be executed in cooperation with the server 200 or another apparatus (e.g., another game apparatus, another mobile terminal, etc.) that can communicate with the information processing apparatus 3. Thus, processes similar to the above processes can be performed by the server 200 or another apparatus performing a portion of the steps of the process. The above processes may be executed by a single processor or a plurality of cooperating processors included in an information processing system including at least one information processing apparatus. In the above non-limiting examples, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example can be implanted in a so-called cloud computing system form or distributed wide-area and local-area network system forms. For instance, in a distributed local-area network system, the above process can be executed by cooperation between a stationary information processing apparatus (a stationary game apparatus) and a mobile information processing apparatus (handheld game apparatus). It should be noted that, in these system forms, each of the steps of the above processes may be performed by substantially any of the apparatuses, and this non-limiting example may be implemented by assigning the steps to the apparatuses in substantially any manner.

The order of steps, setting values, conditions for determination, etc., used in the above information process are merely for illustrative purposes, and other order of steps, setting values, conditions for determination, etc., may be used to implement this non-limiting example.

The above programs may be supplied to the information processing apparatus 3 not only through an external storage medium, such as an external memory, but also through a wired or wireless communication line. The programs may be previously stored in a non-volatile storage device in the information processing apparatus 3. Examples of an information storage medium storing the programs may include non-volatile memories, and in addition, CD-ROMs, DVDs, optical disc-like storage media similar thereto, and flexible disks, hard disks, magneto-optical disks, and magnetic tapes. The information storage medium storing the programs may be a volatile memory storing the programs. Such a storage medium may be said as a storage medium that can be read by a computer, etc. For instance, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertains. If there is any inconsistency or conflict, the present specification (including the definitions) shall prevail.

As described above, this non-limiting example is useful as, for instance, an information processing system and information processing program that allow improvement in the user's convenience of choosing contents for use in a game during a specific period of time.

What is claimed is:

1. An information processing system comprising:
   a computer that is configured to execute operations comprising:
   arranging contents of a video game that are chosen by a user into a plurality of groups, wherein each one of the contents of the video game are objects that are usable within the video game, wherein the plurality of groups includes at least one first group and at least one second group;
   during a first period of time, presenting, on a display screen that is coupled to the computer, the first group as an option for selection by the user, wherein the first group is presented with a higher priority than that of other ones of the plurality of groups,
   during a second period of time, presenting, on the display screen that is coupled to the computer, the second group as an option for selection by the user, of the groups stored in the storage medium as an option, wherein the second group is presented with a higher priority than that of other ones of the plurality of groups;
   determining one of the presented groups chosen by the user, as a group to be used in a game process; and
   performing the game process using contents included in the determined group,
   in the case where a period of time during which the game process is performed is included in the first period of time, and the determined one of the presented groups includes contents associated with the first period of time, the game process is performed so as to obtain an effect, and in the case where a period of time during which the game process is performed is included in the second period of time, and the determined one of the presented groups includes contents associated with the second period of time, the game process is performed so as to obtain an effect.

2. The information processing system according to claim 1, wherein
   only the first group is presented as an option during the first period of time, and only the second group is presented as an option during the second period of time.

3. The information processing system according to claim 1, wherein
   the plurality of groups includes at least one third group including contents chosen by the user, the operations further comprise:
setting a first option setting in which the third group is excluded from options, or a second option setting in which the third group is included in options,
in the case where the first option setting is set, the first group is presented as an option to the user, with a higher priority than that of other options, during the first period of time, and the second group is presented as an option to the user, with a higher priority than that of other options, during the second period of time, and
in the case where the second option setting is set, the third group of the groups stored in the storage medium is presented as an option to the user, with a higher priority than that of other options, both during the first period of time and during the second period of time.

4. The information processing system according to claim 1, wherein the operations further comprise, alternately setting at least the first period of time and the second period of time.

5. The information processing system according to claim 1, wherein
the operations further comprise:
in the case where the game process is performed during the first period of time, obtaining information about contents included in a first defensive group that is set by another user as a defensive group to be used during the first period of time, and in the case where the game process is performed during the second period of time, obtaining information about contents included in a second defensive group that is set by another user as a defensive group to be used during the second period of time,
in the case where the game process is performed during the first period of time, a battle game is performed in which contents included in the obtained first defensive group are caused to appear, on defense, and contents included in the determined group are caused to appear, on offense, and
in the case where the game process is performed during the second period of time, a battle game is performed in which contents included in the obtained second defensive group are caused to appear, on defense, and contents included in the determined group are caused to appear, on offense.

6. The information processing system according to claim 1, wherein the operations further comprise:
presenting, to the user, an organization screen for the first group and/or the second group, and
the organization screen is presented, including information about an effect obtained in the game process in the case where the first group is used during the first period of time, and the organization screen is presented, including information about an effect obtained in the game process in the case where the second group is used during the second period of time.

7. A non-transitory computer-readable storage medium having stored therein an information processing program executed by a computer of an information processing apparatus, the information processing program configured to cause the computer to execute:
arranging contents of a video game that are chosen by a user into a plurality of groups, wherein each one of the contents of the video game are objects that are usable within the video game, wherein the plurality of groups includes at least one first group and at least one second group;
during a first period of time, presenting, on a display screen that is coupled to the computer, the first group as an option for selection by the user, wherein the first group is presented with a higher priority than that of other ones of the plurality of groups,
during a second period of time, presenting, on the display screen that is coupled to the computer, the second group as an option for selection by the user, of the groups stored in the storage medium as an option, wherein the second group is presented with a higher priority than that of other ones of the plurality of groups;
determining one of the presented groups chosen by the user, as a group to be used in a game process; and
performing the game process using contents included in the determined group,
in the case where a period of time during which the game process is performed is included in the first period of time, and the determined one of the presented groups includes contents associated with the first period of time, the game process is performed so as to obtain an effect, and in the case where a period of time during which the game process is performed is included in the second period of time, and the determined one of the presented groups includes contents associated with the second period of time, the game process is performed so as to obtain an effect.

8. An information processing system comprising:
at least one hardware processor configured to perform operations including:
arranging contents of a video game that are chosen by a first user into a plurality of groups, wherein each one of the contents of the video game are objects that are usable within the video game, wherein the plurality of groups includes at least one first group and at least one second group;
during a first period of time, presenting, on a display screen that is coupled to the computer, the first group as an option for selection by a second user, wherein the first group is presented with a higher priority than that of other ones of the plurality of groups;
during a second period of time, presenting, on the display screen that is coupled to the computer, the second group as an option for selection by the second user, of the groups stored in the storage medium as an option, wherein the second group is presented with a higher priority than that of other ones of the plurality of groups;
storing, into the storage medium, first field information including information about contents included in the first group and game field information about locations where the contents are disposed, and second field information including information about contents included in the second group and game field information about locations where the contents are disposed; and
in the case where a game process is performed during the first period of time using contents of the second user according to the second user's operation instruction, the game process is performed using the first field information, and in the case where a game process is performed during the second period of time using contents of the second user according to the second user's operation instruction, the game process is performed using the second field information.

9. A non-transitory computer-readable storage medium having stored therein an information processing program executed by a computer of an information processing apparatus, the information processing program configured to cause the computer to execute:

arranging contents of a video game that are chosen by a first user into a plurality of groups, wherein each one of the contents of the video game are objects that are usable within the video game, wherein the plurality of groups includes at least one first group and at least one second group;

during a first period of time, presenting, on a display screen that is coupled to the computer, the first group as an option for selection by a second user, wherein the first group is presented with a higher priority than that of other ones of the plurality of groups;

during a second period of time, presenting, on the display screen that is coupled to the computer, the second group as an option for selection by the second user, of the groups stored in the storage medium as an option, wherein the second group is presented with a higher priority than that of other ones of the plurality of groups;

storing, into the storage medium, first field information including information about contents included in the first group and game field information about locations where the contents are disposed, and second field information including information about contents included in the second group and game field information about locations where the contents are disposed; and in the case where a game process is performed during the first period of time using contents of the second user according to the second user's operation instruction, the game process is performed using the first field information, and in the case where a game process is performed during the second period of time using contents of the second user according to the second user's operation instruction, the game process is performed using the second field information.

* * * * *